(12) United States Patent
Ohmura

(10) Patent No.: US 10,444,942 B2
(45) Date of Patent: Oct. 15, 2019

(54) DISPLAY CONTROL APPARATUS AND DISPLAY CONTROL METHOD TO OPTIMIZE AND DISPLAY OBJECTS OF VARIOUS FORMS

(71) Applicant: SONY CORPORATION, Tokyo (JP)

(72) Inventor: Junki Ohmura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 168 days.

(21) Appl. No.: 15/314,581

(22) PCT Filed: Jun. 4, 2015

(86) PCT No.: PCT/JP2015/066267
§ 371 (c)(1),
(2) Date: Nov. 29, 2016

(87) PCT Pub. No.: WO2015/194386
PCT Pub. Date: Dec. 23, 2015

(65) Prior Publication Data
US 2017/0199632 A1    Jul. 13, 2017

(30) Foreign Application Priority Data

Jun. 16, 2014   (JP) ................. 2014-123566

(51) Int. Cl.
*G06F 3/14* (2006.01)
*G06F 3/0482* (2013.01)
(Continued)

(52) U.S. Cl.
CPC .......... *G06F 3/0482* (2013.01); *G06F 3/0481* (2013.01); *G06F 3/0484* (2013.01);
(Continued)

(58) Field of Classification Search
CPC ..................................... G06F 3/14; G06F 3/17
(Continued)

(56) References Cited

U.S. PATENT DOCUMENTS 7,437,317 B1 * 10/2008 Xia ........................ G06Q 30/02
                                                    705/26.1
2014/0245115 A1 * 8/2014 Zhang ..................... G06F 17/24
                                                    715/202
(Continued)

FOREIGN PATENT DOCUMENTS

JP    2010-102053 A    5/2010
WO   2013/186896 A1   12/2013

OTHER PUBLICATIONS

Ryosuke Takeuchi, "Use and remember! How to Use Windows 8.1", Feb. 24, 2014, pp. 122 to 125.
(Continued)

*Primary Examiner* — Ruay Ho
(74) *Attorney, Agent, or Firm* — Chip Law Group

(57) ABSTRACT

A display control apparatus including a display form determination unit configured to determine a display form of an additional display item which is to be additionally displayed on a screen according to a display item addition request, on the basis of first information about the additional display item, and second information about an already displayed item which has already been displayed on the screen before the additional display item is displayed and an issuance unit configured to issue display control information for controlling display of the screen on the basis of the display form of the additional display item determined by the display form determination unit.

16 Claims, 22 Drawing Sheets

ITEM A
ITEM: "IT IS NICE WEATHER TODAY"
TYPE: TEXT
PRIORITY: 30

LAYOUT PATTERN-1

LAYOUT PATTERN-2   TEXT DISPLAY REGION

ITEM B
ITEM: "TODAY IS THE LAST DAY TO PAY YOUR RENT!"
TYPE: TEXT
PRIORITY: 85

(51) Int. Cl.
  *G06F 3/0481* (2013.01)
  *G09G 5/00* (2006.01)
  *G09G 5/36* (2006.01)
  *G06F 3/0484* (2013.01)
  *G06F 9/451* (2018.01)
  *G09G 5/14* (2006.01)

(52) U.S. Cl.
  CPC ............... *G06F 3/14* (2013.01); *G06F 9/451* (2018.02); *G09G 5/00* (2013.01); *G09G 5/14* (2013.01); *G09G 5/36* (2013.01); *G06F 2203/04803* (2013.01); *G09G 2340/14* (2013.01); *G09G 2354/00* (2013.01)

(58) Field of Classification Search
  USPC .............. 715/202, 765, 815; 705/14.54, 26.1
  See application file for complete search history.

(56) References Cited

U.S. PATENT DOCUMENTS

2015/0248698 A1\* 9/2015 Bhattacharjee .... G06Q 30/0256
  705/14.54
2016/0110082 A1\* 4/2016 Zhang ................... G06F 17/212
  715/765

OTHER PUBLICATIONS

Shigeru Iwabuchi, "Simpler with this! Windows 8.1", Mar. 24, 2014, pp. 91 to 94.
Katsuhiko Arai, "Windows Classroom", Apr. 13, 2005, pp. 117 to 120.

\* cited by examiner

DISPLAY CONTROL APPARATUS AND DISPLAY CONTROL METHOD TO OPTIMIZE AND DISPLAY OBJECTS OF VARIOUS FORMS

CROSS REFERENCE TO RELATED APPLICATIONS

This application is a U.S. National Phase of International Patent Application No. PCT/JP2015/066267 filed on Jun. 4, 2015, which claims priority benefit of Japanese Patent Application No. JP 2014-123566 filed in the Japan Patent Office on Jun. 16, 2014. Each of the above-referenced applications is hereby incorporated herein by reference in its entirety.

TECHNICAL FIELD

The present disclosure relates to display control apparatuses, display control methods, and computer programs.

BACKGROUND ART

Among systems having high layout flexibility are a proposed system capable of automatically determining a screen layout, and displaying objects such as contents, items, and the like according to the screen layout, as with a technique disclosed in Patent Literature 1, for example.

CITATION LIST

Patent Literature

Patent Literature 1: JP 2010-102053A

SUMMARY OF INVENTION

Technical Problem

In systems having high layout flexibility, when objects having various forms are displayed, it is desirable to flexibly set and automatically optimize locations and sizes at and with which the objects are displayed.

With the above in mind, the present disclosure proposes a novel and improved display control apparatus, display control method, and computer program capable of automatically optimizing and displaying objects having various forms in a system having high layout flexibility.

Solution to Problem

According to the present disclosure, there is provided a display control apparatus including: a display form determination unit configured to determine a display form of an additional display item which is to be additionally displayed on a screen according to a display item addition request, on the basis of first information about the additional display item, and second information about an already displayed item which has already been displayed on the screen before the additional display item is displayed; and an issuance unit configured to issue display control information for controlling display of the screen on the basis of the display form of the additional display item determined by the display form determination unit.

According to the present disclosure, there is provided a display control method including: determining a display form of an additional display item which is to be additionally displayed on a screen according to a display item addition request, on the basis of first information about the additional display item, and second information about an already displayed item which has already been displayed on the screen before the additional display item is displayed; and issuing display control information for controlling display of the screen on the basis of the determined display form of the additional display item.

According to the present disclosure, there is provided a computer program for causing a computer to execute: determining a display form of an additional display item which is to be additionally displayed on a screen according to a display item addition request, on the basis of first information about the additional display item, and second information about an already displayed item which has already been displayed on the screen before the additional display item is displayed; and issuing display control information for controlling display of the screen on the basis of the determined display form of the additional display item.

Advantageous Effects of Invention

As described above, according to the present disclosure, a novel and improved display control apparatus, display control method, and computer program capable of automatically optimizing and displaying objects having various forms in a system having high layout flexibility, can be provided.

Note that the effects described above are not necessarily limitative. With or in the place of the above effects, there may be achieved any one of the effects described in this specification or other effects that may be grasped from this specification.

DESCRIPTION OF EMBODIMENT(S)

Figure 1:
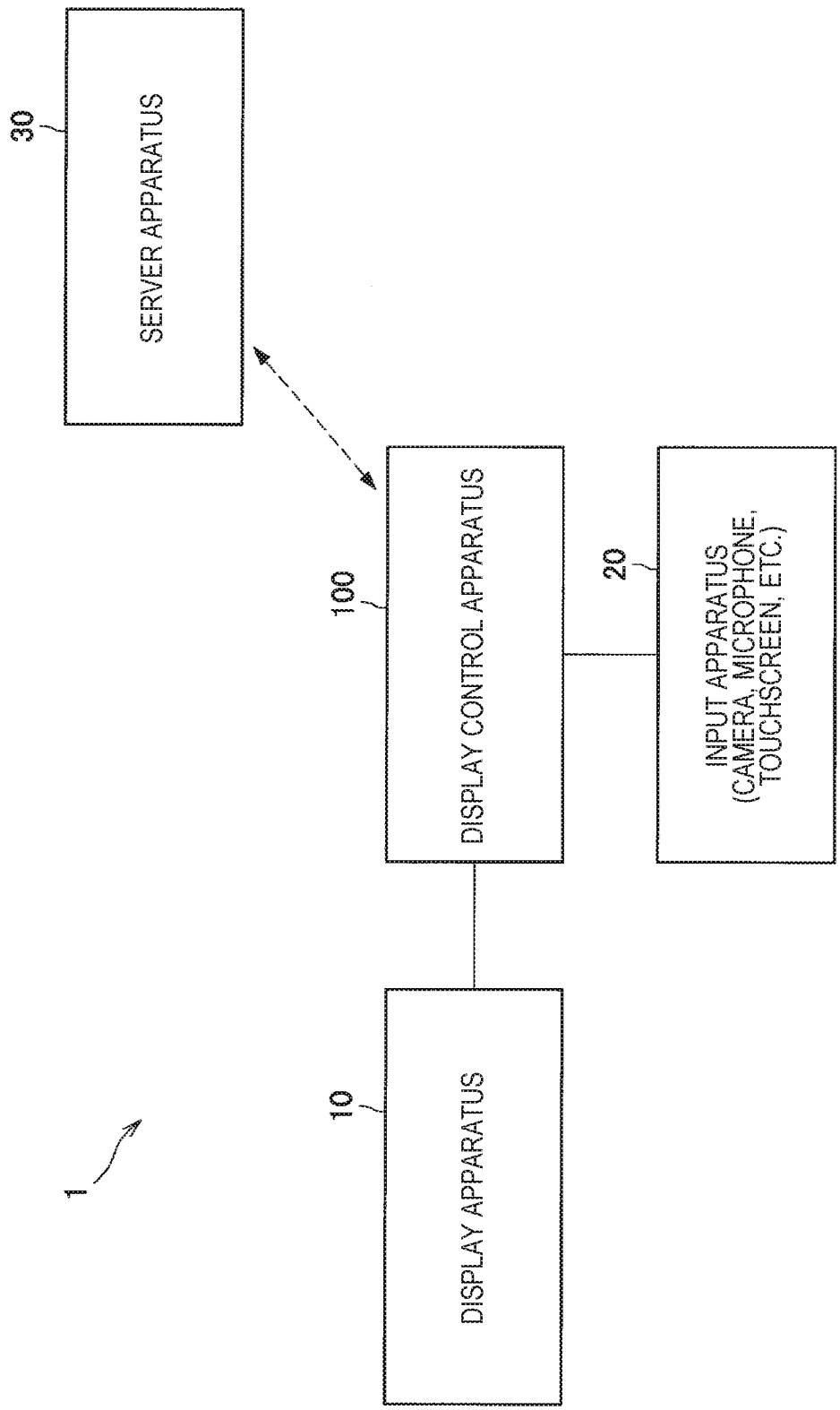
FIG. 1 is a diagram for describing a configuration example of a display system 1 according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. One embodiment of the present disclosure
1.1. System configuration example
1.2. Functional configuration example
1.3. Operation example
2. Conclusion

1. One Embodiment of the Present Disclosure

1.1. System Configuration Example

Firstly, a configuration example of a display system according to one embodiment of the present disclosure will be described with reference to the drawings. FIG. 1 is a diagram for describing a configuration example of a display system 1 according to one embodiment of the present disclosure. The configuration example of the display system 1 according to one embodiment of the present disclosure will now be described with reference to FIG. 1.

As shown in FIG. 1, the display system 1 according to one embodiment of the present disclosure includes a display apparatus 10, an input apparatus 20, a server apparatus 30, and a display control apparatus 100. The display system 1 according to one embodiment of the present disclosure is a system having high layout flexibility as described below. The display system 1 according to one embodiment of the present disclosure is a system having high layout flexibility which is configured to be capable of automatically optimizing and displaying objects having various forms.

The display apparatus 10 is an apparatus which displays characters, images, and any other information under the control of the display control apparatus 100. The display apparatus 10 may display information on itself or by projecting video on another object (e.g., a wall, desk, human body, etc.). The display apparatus 10 may be any apparatus that can display information, such as, for example, a liquid crystal display, organic EL display, projector, head-mounted display (HIVID), wearable device, display device used in a navigation system provided in a car, display device for surgical operations, or the like. When the display apparatus 10 is a projector, the display apparatus 10 is located at a position which allows it to project information onto, for example, a wall of a room or a screen provided in a room. When the display apparatus 10 is a wearable device, the display apparatus 10 may be worn on, for example, a user's head, arm, or the like.

In this embodiment, a character, image, and other information which are to be displayed by the display apparatus 10 under the control of the display control apparatus 100 are each referred to as an "item." Here, an item is an example of an object of the present disclosure. Each item is displayed at a location and in a form which are determined under the control of the display control apparatus 100. As the display form determined under the control of the display control apparatus 100, the size or information amount of an item may be determined. An example in which the size or information amount of an item is determined under the control of the display control apparatus 100 will be described below in detail.

The input apparatus 20 may be an apparatus capable of receiving any information or command from a user, such as, for example, a touchscreen, keyboard, mouse, camera, microphone, sensor, or the like. Information received by the input apparatus 20 is transmitted to the display control apparatus 100. The display control apparatus 100 may control display of the display apparatus 10 on the basis of the information received by the input apparatus 20.

The server apparatus 30 stores various pieces of information involved with the display system 1, and provides information to the display control apparatus 100 as required. The server apparatus 30 is connected to the display control apparatus 100 through the Internet or other networks (not shown). The information stored in the server apparatus 30 may include, for example, various pieces of information about a user who uses the display system 1, which are to be displayed by the display apparatus 10. Examples of the various pieces of information about a user who uses the display system 1 may include a schedule of the user or the user's family, a mail or other messages sent to the user, the weather forecast of the user's residence or destination, and the like. The schedule may include not only the user's own schedule, but also the schedule of an event set by the user, or the like.

Also, the server apparatus 30 may provide various services to a user who uses the display system 1. Examples of the services provided by the server apparatus 30 include mail services, social network services (SNS), and the like.

Of course, informations or services described herein are merely examples of information stored in the server apparatus 30 and information provided by the server apparatus 30. Also, there may be one or more server apparatuses 30.

The display control apparatus 100 is an apparatus which controls display of information by the display apparatus 10.

The display control apparatus 100 may, for example, be a general-purpose apparatus, such as a personal computer (PC) or the like, or alternatively, an apparatus specialized in controlling display of information by the display apparatus 10. In this embodiment, the display control apparatus 100 performs display control to automatically optimize objects having various forms and display the objects on the display apparatus 10. The display control apparatus 100, when controlling display of information on the display apparatus 10, may use information stored in the display control apparatus 100, or may use information stored in the server apparatus 30 in addition to or instead of information stored in the display control apparatus 100. The configuration and detailed operation of the display control apparatus 100 will be described in detail below.

The display control apparatus 100 and the display apparatus 10 are connected together either directly through a wire or wirelessly through a network. When the display control apparatus 100 and the display apparatus 10 are wirelessly connected together, the display control apparatus 100 may be a server apparatus connected to the Internet, for example. When the display control apparatus 100 is a server apparatus, the display control apparatus 100 may be integrated with the server apparatus 30 shown in FIG. 1, or may be separated from the server apparatus 30 shown in FIG. 1.

In the foregoing, a configuration example of the display system 1 according to one embodiment of the present disclosure has been described with reference to FIG. 1. Next, a functional configuration example of the display control apparatus 100 included in the display system 1 according to one embodiment of the present disclosure will be described.

1.2. Functional Configuration Example

Figure 2:
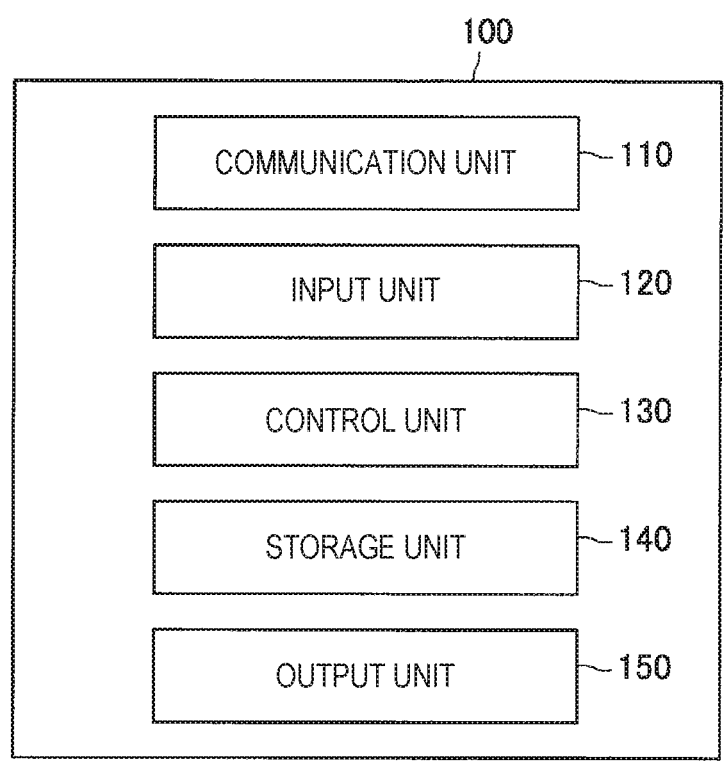
FIG. 2 is a diagram for describing a functional configuration example of a display control apparatus 100 according to one embodiment of the present disclosure.

FIG. 2 is a diagram for describing a functional configuration example of the display control apparatus 100 according to one embodiment of the present disclosure. The functional configuration example of the display control apparatus 100 according to one embodiment of the present disclosure will now be described with reference to FIG. 2.

As shown in FIG. 2, the display control apparatus 100 according to one embodiment of the present disclosure includes a communication unit 110, an input unit 120, a control unit 130, a storage unit 140, and an output unit 150.

The communication unit 110 communicates information with another apparatus (e.g., the server apparatus 30 shown in FIG. 1) through a network. The communication unit 110 communicates information either through a wire or wirelessly. The communication unit 110 provides information received from another apparatus to the control unit 130. Also, the communication unit 110 transmits information provided from the control unit 130 to another apparatus which is a destination of the information.

The input unit 120 is an interface which accepts input of information or a command to the display control apparatus 100. The input unit 120 receives information or a command to the display control apparatus 100 either through a wire or wirelessly. Information to the display control apparatus 100 may be input from, for example, the input apparatus 20. Information to the display control apparatus 100 may include character information, image information, or audio information. Also, a command to the display control apparatus 100 may include, for example, a command to the display apparatus 10 to control display of information.

The control unit 130 controls operations of the display control apparatus 100. The control unit 130 may be, for example, a computation unit such as a central processing unit (CPU) or the like. Examples of the operations of the display control apparatus 100 controlled by the control unit 130 may include the control of display of information (item) on the display apparatus 10, the control of transmission and reception of information to and from other apparatuses through the communication unit 110, the control of storage of information to the storage unit 140, reading of information from the storage unit 140, and outputting of information through the output unit 150, and the like.

In this embodiment, the control unit 130 detects a request to display an item on the display apparatus 10, and on the basis of the detection, selects a suitable template for display of an item on the display apparatus 10 (in this embodiment, the template is also referred to as a "layout pattern"), and performs control to display an item on the display apparatus 10 using the template. By the control unit 130 performing such a series of operations, the display control apparatus 100 according to one embodiment of the present disclosure, which has a configuration as shown in FIG. 2, can automatically optimize and display objects having various forms in a system having high layout flexibility. Note that a detailed functional configuration example of the control unit 130 will be described in detail below.

The storage unit 140 stores various pieces of information. The storage unit 140 may include various storage media, such as, for example, a read only memory (ROM), random access memory (RAM), hard disk drive (HDD), solid state drive (SSD), and the like. Examples of the information stored in the storage unit 140 may include a layout pattern which is used as a base when information is displayed on the display apparatus 10, settings which are used when information is displayed on the display apparatus 10, and the like. Also, the storage unit 140 may store a computer program which is read by the control unit 130.

The output unit 150 is an interface which outputs information or a command from the display control apparatus 100. The output unit 150 outputs information or a command from the display control apparatus 100 either through a wire or wirelessly. As the information output from the display control apparatus 100, the output unit 150 outputs, for example, information for controlling display of the display apparatus 10 (display control information) to the display apparatus 10. The display control information for controlling display of the display apparatus 10 is, for example, information based on a video signal, information based on a markup language, such as HyperText Markup Language (HTML) or the like. Also, the display control information for controlling display of the display apparatus 10 may include information based on a video stream generated by the server apparatus.

The display control apparatus 100 according to one embodiment of the present disclosure, which has a configuration as shown in FIG. 2, can control display of information by the display apparatus 10. In addition, the display control apparatus 100 according to one embodiment of the present disclosure, which has a configuration as shown in FIG. 2, can automatically optimize and display objects having various forms in a system having high layout flexibility.

Next, a functional configuration example of the control unit 130 included in the display control apparatus 100 according to one embodiment of the present disclosure will be described.

Figure 3:
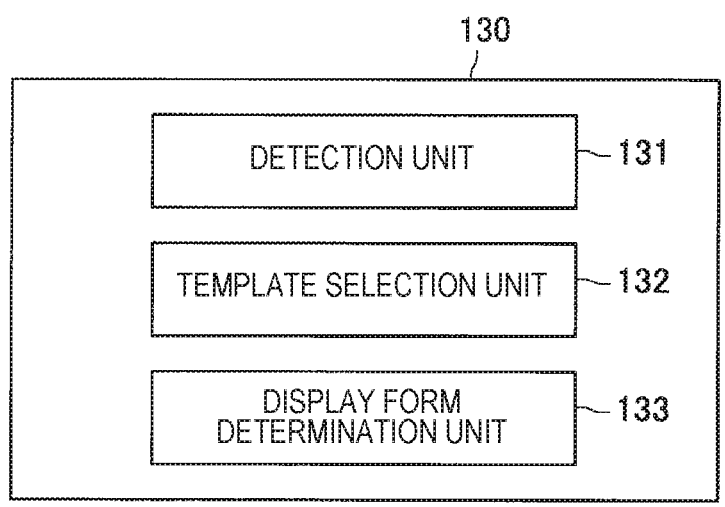
FIG. 3 is a diagram for describing a functional configuration example of a control unit 130 included in a display control apparatus 100.

FIG. 3 is a diagram for describing a functional configuration example of the control unit 130 included in the display control apparatus 100 according to one embodiment of the present disclosure. The functional configuration example of the control unit 130 included in the display control apparatus 100 according to one embodiment of the present disclosure will now be described with reference to FIG. 3.

As shown in FIG. 3, the control unit 130 included in the display control apparatus 100 according to one embodiment of the present disclosure includes a detection unit 132, a template selection unit 134, and a display form determination unit 136.

The detection unit 132 detects a request to display an item on the display apparatus 10. In this embodiment, the request to display an item on the display apparatus 10 is also referred to as the "additional display request." The item additional display request may be generated in various forms. For example, the item additional display request may be generated at a timing when the display apparatus 10 or the display control apparatus 100 is turned on. Alternatively, a user may explicitly input the additional display request using the input apparatus 20. Alternatively, the additional display request may be transmitted from the server apparatus 30 when a predetermined event occurs in a service provided by the server apparatus 30. Alternatively, the additional display request may be generated when a predetermined time, date, or day of the week comes.

A user may input the additional display request using an input device, such as a keyboard, mouse, touchscreen, or the like, or using the user's gesture, voice, or the like. For example, the input apparatus 20 may be equipped with a camera for capturing an image of a user's gesture. The detection unit 132 may analyze a user's gesture captured by the camera included in the input apparatus 20, to determine what additional display request has been input by the user. Also, for example, the input apparatus 20 may be equipped with a microphone for collecting a user's speech. The detection unit 132 may analyze a speech uttered by a user which has been collected by the microphone included in the input apparatus 20, to determine what additional display request has been input. Therefore, the detection unit 132 may execute the process of analyzing an image or the process of analyzing audio.

Of course, the process of analyzing an image or the process of analyzing audio may be executed by a functional block different from the detection unit 132 in the display control apparatus 100, or may be executed in an apparatus different from the display control apparatus 100, such as, for example, the input apparatus 20. When the process of analyzing an image or the process of analyzing audio is executed in a functional block different from the detection unit 132, the detection unit 132 may acquire the result of the analysis, and determine what additional display request has been input by a user, on the basis of the analysis result. The detection unit 132, when detecting the additional display request, notifies the template selection unit 134 that the additional display request has been detected.

The template selection unit 134, when displaying an item on the display apparatus 10, selects a layout pattern suitable for a situation. The template selection unit 134 may select a layout pattern from, for example, those stored in the storage unit 140. The template selection unit 134, when notified by the detection unit 132 that the additional display request has been detected, selects a layout pattern suitable for an item to be added, on the basis of information about the item. Note that the template selection unit 134 may have the function of generating a new layout pattern when the template selection unit 134 has failed to select a layout pattern suitable for an item to be added from those stored in the storage unit 140.

The display form determination unit 136 determines an item arrangement pattern in the layout pattern selected by the template selection unit 134, or a display form which is to be used when an item is displayed in a layout pattern. An item displayed on the display apparatus 10 according to a layout pattern may have various display forms as described below. The display form determination unit 136 determines an item arrangement pattern in a layout pattern selected by the template selection unit 134, or a display form which is to be used when an item is displayed in a layout pattern, on the basis of various indexes described below. Note that, in this embodiment, the concept "display form" is assumed to encompass not only the form of a displayed item but also the form of an item which is not displayed. After determining a display form for an item, the display form determination unit 136 generates display control information for displaying the item on the display apparatus 10 on the basis of the display form, and outputs the generated display control information to the output unit 150. Therefore, the output unit 150 functions as an example of an issuance unit of the present disclosure.

Figure 4A:
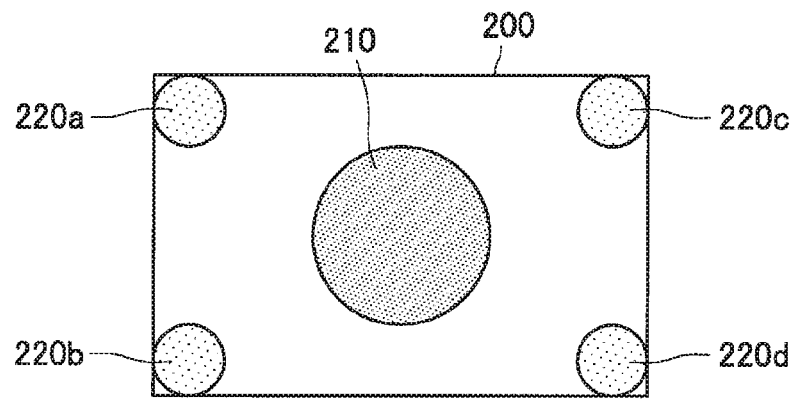
FIG. 4A is a diagram for describing an example layout pattern 200 which is used to display an item on a display apparatus 10.
Figure 4B:
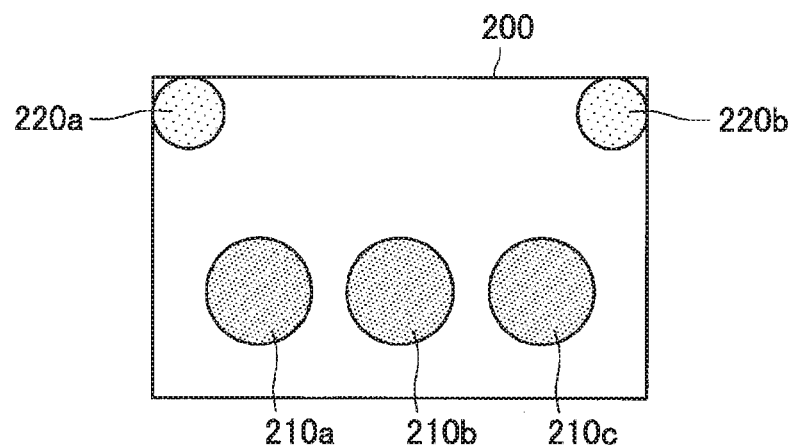
FIG. 4B is a diagram for describing an example layout pattern 200 which is used to display an item on a display apparatus 10.
Figure 4C:
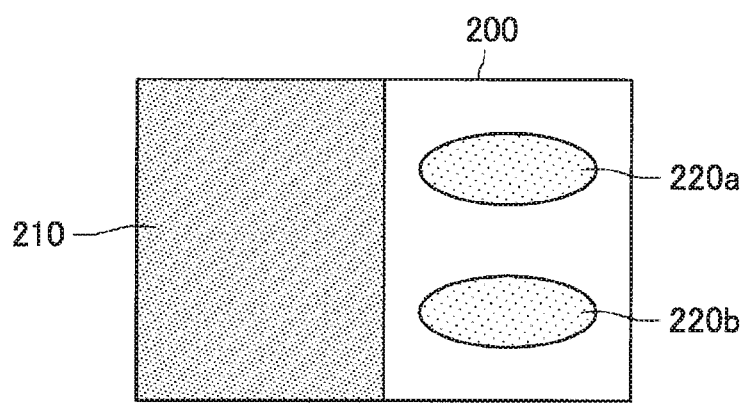
FIG. 4C is a diagram for describing an example layout pattern 200 which is used to display an item on a display apparatus 10.

Here, a layout pattern which is used to display an item on the display apparatus 10 in this embodiment will be described. FIGS. 4A to 4C are diagrams for describing an example layout pattern 200 which is used to display an item on the display apparatus 10.

The layout pattern 200 in this embodiment is generated according to an information display region of the display apparatus 10 in advance. Note that the layout pattern 200 may be designed and stored in the display control apparatus 100 during the design of the display apparatus 10. Alternatively, after the shipment of the display apparatus 10, the layout pattern 200 may be newly designed. As shown in FIG. 4A, the layout pattern 200 in this embodiment includes a main display region 210 and sub-display regions 220a to 220d. The main display region 210 is a region for displaying information which should be mainly displayed, and may be provided in, for example, a center portion of a screen as shown in FIG. 4A. The sub-display regions 220a to 220d are a region for displaying information which should not be mainly displayed, but still should be displayed. Information displayed in the sub-display regions 220a to 220d may or may not be related to information displayed in the main display region 210.

As elements of the layout pattern 200, information is stored, such as the number of display regions, the coordinates of each display region, the type of contents to be displayed in each display region (an image, such as text, a list, an illustration, a still image, a moving image, or the like, a dynamic effect, a map, a browser, an SNS, or a combination thereof, etc.), and the like. The display control apparatus 100 selects the layout pattern 200 suitable for display of an item, using information about the layout pattern 200, information about an item to be displayed on the display apparatus 10, and information about an item which has already been displayed on the display apparatus 10 if any. After selecting the layout pattern 200 suitable for display of an item, the display control apparatus 100 transmits a signal to the display apparatus 10 so that the item is to be displayed in the layout pattern 200.

The layout pattern 200 may have various layouts. While FIG. 4A shows the layout pattern 200 which has only a single main display region 210, FIG. 4B shows the layout pattern 200 which has three main display regions 210a, 210b, and 210c, and two sub-display regions 220a and 220b. Also, FIG. 4C shows the layout pattern 200 which has a region where an image is to be displayed as a main display region 210, and two sub-display regions 220a and 220b to the right of and next to the main display region 210. Of course, the layout pattern 200 is not limited to those shown in FIGS. 4A to 4C.

The display control apparatus 100 according to one embodiment of the present disclosure has the above configuration, and can thereby select a suitable layout pattern 200 and automatically optimize and display objects (items) having various display forms, in a system having high layout flexibility.

In the foregoing, a functional configuration example of the display control apparatus 100 included in the display system 1 according to one embodiment of the present disclosure has been described. Next, an operation example of the display control apparatus 100 included in the display system 1 according to one embodiment of the present disclosure will be described.

1.3. Operation Example

Figure 5:
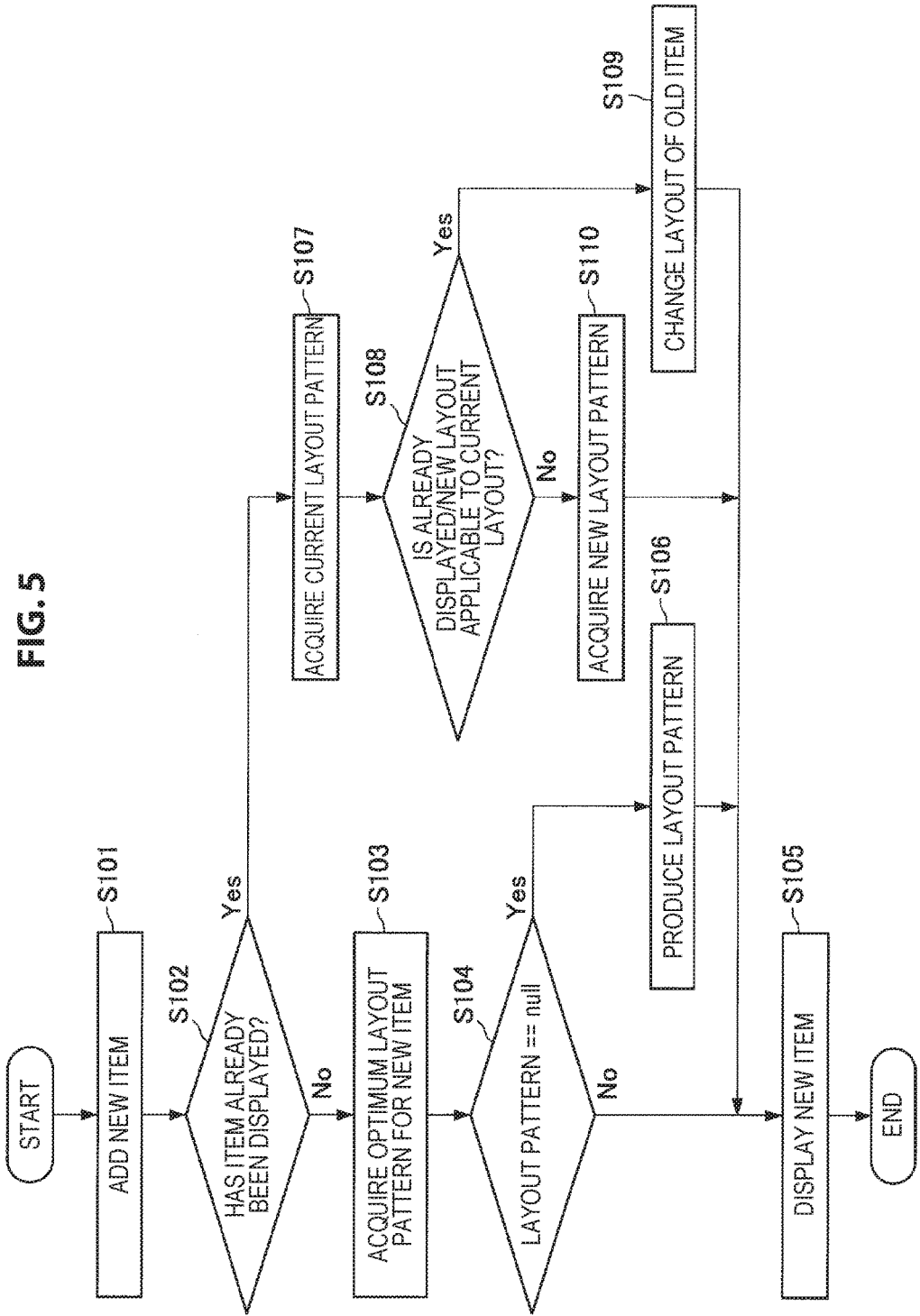
FIG. 5 is a flowchart showing an operation example of a display control apparatus 100 included in a display system 1 according to one embodiment of the present disclosure.

FIG. 5 is a flowchart showing an operation example of the display control apparatus 100 included in the display system 1 according to one embodiment of the present disclosure. In the operation example of the display control apparatus 100 shown in FIG. 5, the additional display request to display an item on the display apparatus 10 is detected, and the item is displayed on the display apparatus 10 according to the additional display request. The operation example of the display control apparatus 100 will now be described with reference to FIG. 5.

In order to display an item on the display apparatus 10 according to the additional display request, the display control apparatus 100 initially detects addition of a new item to be displayed on the display apparatus 10 (step S101). Addition of a new item may be detected by, for example, the above detection unit 132.

An item may be added by various methods. For example, a user may input the additional display request for adding and displaying an item on the display apparatus 10, using the input apparatus 20. As described above, the additional display request may be input using an input device provided as the input apparatus 20, such as a keyboard, mouse, touchscreen, or the like, or using a user's gesture, voice, or the like. Alternatively, the additional display request may be input from a service provided by the server apparatus 30 to the display control apparatus 100 (so-called push notification), or may be input from a service provided by the server apparatus 30 to the display control apparatus 100 in response to an inquiry periodically sent from the display control apparatus 100 to the server apparatus 30 (so-called polling notification). For example, when the service provided by the server apparatus 30 is a mail service or an SNS, a message to a user may be acquired as the additional display request. Also, for example, when the server apparatus 30 provides information which may vary at predetermined intervals, such as weather information, the display control apparatus 100 may acquire the additional display request by acquiring the information from the server apparatus 30 at predetermined intervals.

Also, the display control apparatus 100 may change the arrangement, properties, or display form of an item to be added, according to a physical state of a user(s), such as, for example, a location of the user (the distance between the display surface of the display apparatus 10 and the user), the line of sight of the user, the orientation of the face, or the number of the users in front of the display surface of the display apparatus 10. For example, if the distance between the display surface of the display apparatus 10 and the user is a predetermined distance or less, the display control apparatus 100 may perform control to display the item having a reduced size on the display apparatus 10, or reduce the font size if the item is text. If the distance is a predetermined distance or more, the display control apparatus 100 may display the item having an increased size on the display apparatus 10, or increase the font size if the item is text.

When the addition of a new item has been detected in step S101, the display control apparatus 100 determines whether or not any item has already been displayed by the display apparatus 10 (step S102). The determination in step S102 of whether or not any item has already been displayed by the display apparatus 10 may be executed by, for example, the display form determination unit 136.

When the result of the determination in step S102 indicates that no item has already been displayed by the display apparatus 10 (step S102, No), the display control apparatus 100 executes the process of acquiring an optimum layout pattern for the new item detected in step S101 (step S103). The process of step S103 of acquiring an optimum layout pattern for a new item may be executed by, for example, the template selection unit 134.

When the process of acquiring an optimum layout pattern for a new item has been executed in step S103, then the display control apparatus 100 determines whether or not an optimum layout pattern for the new item has been successfully acquired (whether or not the layout pattern==null) (step S104). The determination in step S104 of whether or not a layout pattern has been successfully acquired may be performed by, for example, the template selection unit 134.

When the result of the determination in step S104 indicates that an optimum layout pattern for the new item has been successfully acquired (step S104, No), then the display control apparatus 100 determines a display form using the acquired layout pattern, and instructs the display apparatus 10 to display the new item in the determined display form (step S105). The process of step S105 may be executed by, for example, the display form determination unit 136.

When the display apparatus 10 has determined that no item has already been displayed, there is no item displayed by the display apparatus 10, and therefore, the display control apparatus 100 selects layout patterns 200 having a single main display region 210 as shown in, for example, FIGS. 4A and 4C, and further selects a single layout pattern 200 suitable for the item to be displayed from those layout patterns 200. For example, when the item to be displayed is an icon, the display control apparatus 100 may select a layout pattern 200 as shown in FIG. 4A. Also, for example, when the item to be displayed is an image, the display control apparatus 100 may select a layout pattern 200 as shown in FIG. 4C. When a layout pattern 200 suitable for the item to be displayed is selected by the display control apparatus 100, each display region of the layout pattern 200 may have information about corresponding contents. Also, for example, if a display region is designated for an item to be additionally displayed, the display control apparatus 100 may cause the template selection unit 134 to select a layout pattern according to the designation, and cause the display form determination unit 136 to determine the arrangement of the item. For example, when there is a constraint that a certain item is always arranged at the center of the screen, the display control apparatus 100 may cause the template selection unit 134 to select a layout pattern which satisfies the constraint, and may cause the display form determination unit 136 to determine the arrangement of the item.

Figure 6A:
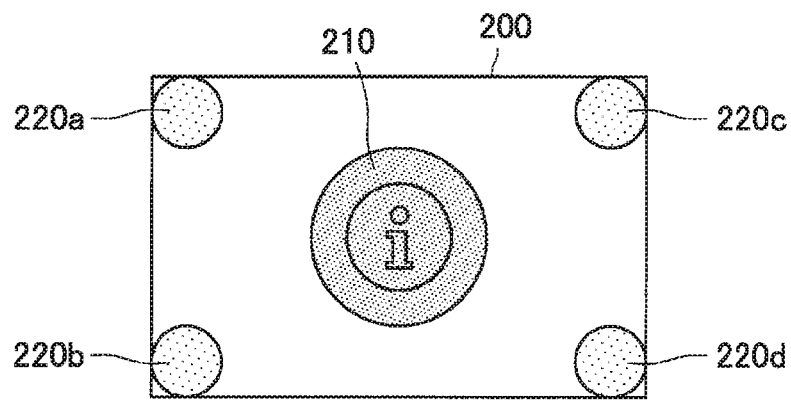
FIG. 6A is a diagram for describing a situation where an item is displayed in a layout pattern.
Figure 6B:
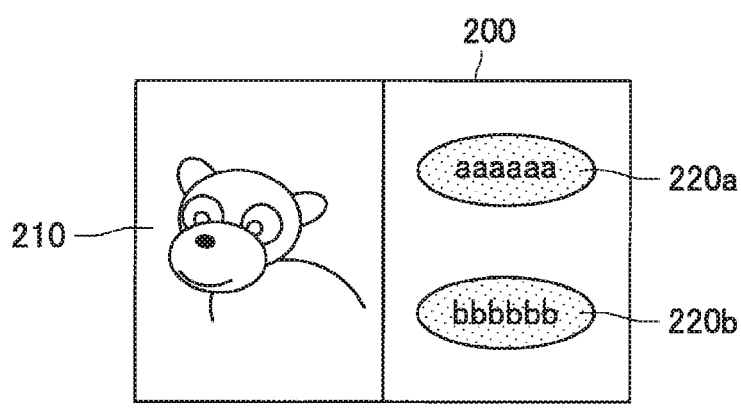
FIG. 6B is a diagram for describing a situation where an item is displayed in a layout pattern.

FIGS. 6A and 6B are diagrams for describing a situation where items are displayed in a layout pattern. FIG. 6A is a diagram for describing a situation where an icon is displayed in the main display region 210 of the layout pattern 200 shown in FIG. 4A under the control of the display control apparatus 100. FIG. 6B is a diagram for describing a situation where an image is displayed in the main display region 210 of the layout pattern 200 shown in FIG. 4C under the control of the display control apparatus 100. The layout pattern 200 can be specialized in displaying specific contents, because each display region has information about corresponding contents.

An item to be newly displayed on the display apparatus 10 may have a display priority or a display region request. In addition, each display region in the layout pattern 200 may have a corresponding priority or display region. The display control apparatus 100 may select a layout pattern by utilizing information about a display priority or display region request possessed by an item and information about a priority or display region possessed by each display region of the layout pattern 200.

For example, when only one item is to be displayed, the item may be displayed to fill the entire screen even if the item to be displayed is not very important information (for a user), unless a priority or a display region is taken into consideration. Meanwhile, if an item to be displayed has a priority or a display region request, the display control apparatus 100 can provide an optimum display for the item to be displayed.

Figure 7:
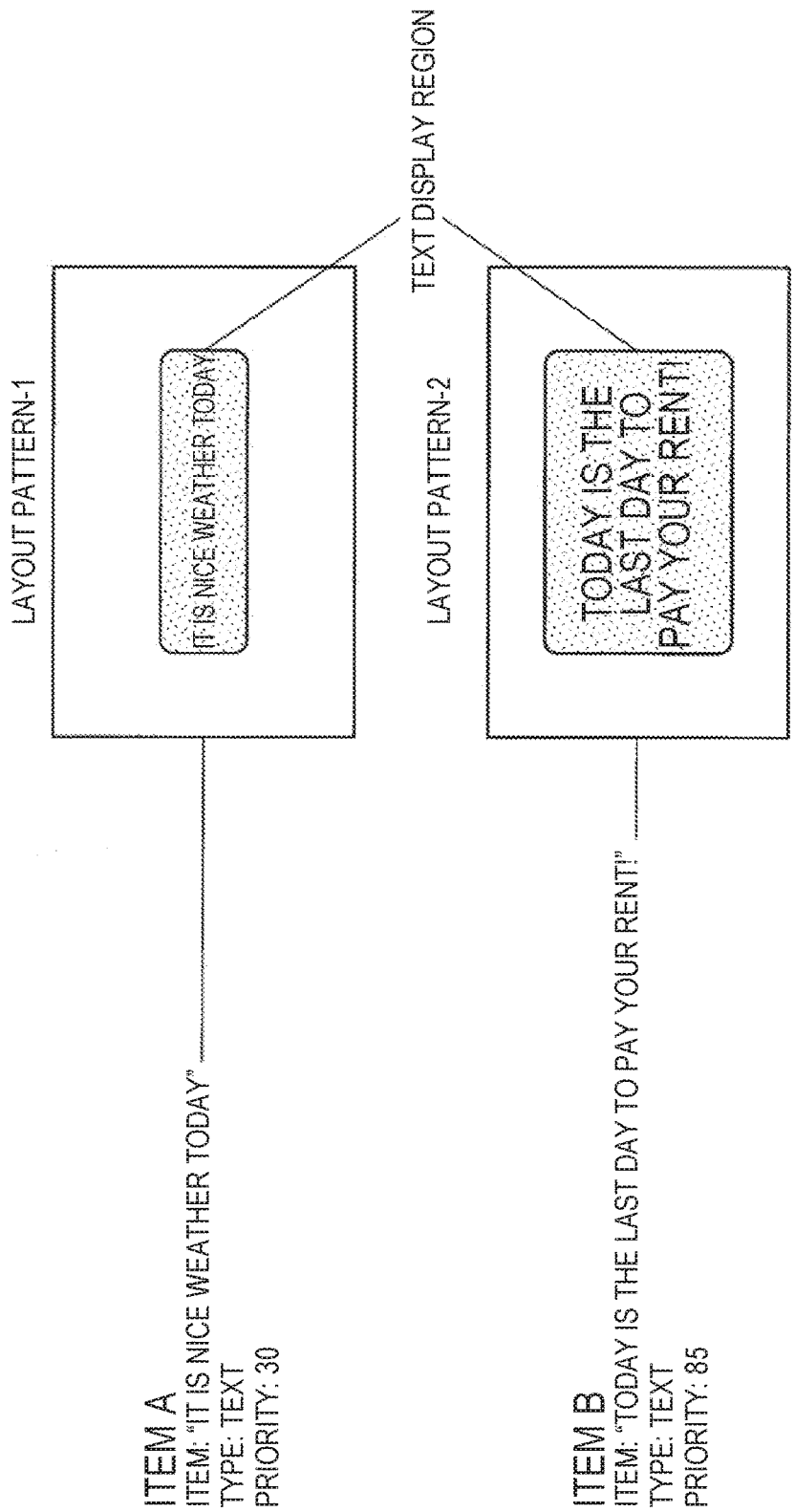
FIG. 7 is a diagram for describing a situation where a display control apparatus 100 determines to display an item, taking the priority of the item into consideration.

FIG. 7 is a diagram for describing a situation where the display control apparatus 100 determines to display an item, taking the priority of the item into consideration. In the example shown in FIG. 7, a system is assumed which has a layout pattern-1 and a layout pattern-2 each having a single region for displaying text as a main display region, and these single regions are different from each other. FIG. 7 shows an example in which the layout pattern-2 has a larger region for displaying text than that of the layout pattern-1. Also, FIG. 7 shows two items A and B having a priority of 30 and 85, respectively, where the maximum priority is 100, for example. When the item A is to be newly added, the (absolute) priority is lower, and therefore, the display control apparatus 100 selects the layout pattern-1. When the item B is to be newly added, the (absolute) priority is higher, and therefore, the display control apparatus 100 selects the layout pattern-2. Thus, even when there are similar items and layout patterns, these can be flexibly displayed by utilizing a priority or a display region. Of course, the present disclosure is applicable to other items to be displayed, such as an image and the like, in addition to text.

The display control apparatus 100 may change places where an item is to be output, according to the priority of the item. For example, the display control apparatus 100 may perform control to display an item in a main display region if the priority of the item is higher than a predetermined threshold, and in a sub-display region if the priority of the item is lower than or equal to the predetermined threshold. Alternatively, the display control apparatus 100 may detect a user's line of sight, and change places where an item is to be output, according to the line of sight. Also, the display control apparatus 100 may change the size of a region where an item is to be displayed, even for the same layout pattern.

When the result of the determination in step S104 indicates that an optimum layout pattern for a new item has not been successfully acquired (step S104, Yes), then the display control apparatus 100 executes the process of producing a new layout pattern (step S106). The process of step S106 of producing a layout pattern may be executed by, for example, the template selection unit 134. After producing a layout pattern, the display control apparatus 100 may store the produced layout pattern into, for example, the storage unit 140.

A layout pattern cannot be found, for example, when there is no layout pattern suitable for an item, when there are no contents suitable for a display region, and the like.

The process of producing a layout pattern will be described by way of example. The display control apparatus 100 may, for example, search for a server apparatus, and downloads a suitable layout pattern. Also, for example, when a layout pattern used by another user has been published, then if the layout pattern is suitable for new display of an item, the display control apparatus 100 may download and utilize the layout pattern.

The display control apparatus 100 may also utilize, for example, similar layout patterns. For example, when an additional display request has been input which is to display an item having an attribute indicating that the type of contents is of undefined <moving image> on the display apparatus 10, the display control apparatus 100 may retrieve a layout pattern suitable for display, on the basis of another attribute (e.g., a display region) or the like. Thereafter, the display control apparatus 100 may control the display apparatus 10 so that the item to be additionally displayed is displayed in the retrieved layout pattern.

For example, when a layout pattern has already been provided which is applicable to the type of contents which is of already defined <still image>, the display control apparatus 100 may display an item having an attribute indicating that the type of contents is of undefined <moving image> on the display apparatus 10 in the layout pattern which is applicable to a still image. For example, when the display control apparatus 100 has determined to display a moving image in the layout pattern which is applicable to a still image, the display control apparatus 100 may store such a measure so that the measure will be taken in the future. Note that when a layout pattern for the type of contents <moving image> has been newly acquired using a certain method, the display control apparatus 100 may display an item having an attribute indicating that the type of contents is of <moving image>, in the acquired layout pattern. When similar layout patterns are available, the display control apparatus 100 may determine whether or not layout patterns are similar to each other, only on the basis of display regions, irrespective of the type of contents of an item to be additionally displayed.

The display control apparatus 100 may allow a user to produce a layout pattern, for example. When a user is allowed to produce a layout pattern, a user may produce a layout pattern dynamically at a timing when an item is additionally displayed, or previously before an item is additionally displayed. For example, the display control apparatus 100 may have an application which allows a user to produce a layout pattern, and allows a user to customize and generate a layout pattern using a mouse, gesture, keyboard, voice, or the like. When a user is allowed to produce a layout pattern, the display control apparatus 100 may allow a user to produce a new layout pattern, or modify an existing layout pattern as a base, or a copy of an existing layout pattern. When a user is allowed to produce a layout pattern, the display control apparatus 100 may allow a user to, for example, customize a region where text is displayed so that the font size is changed, the second and following rows are displayed, or a part of the text is omitted, or customize a region where an image is displayed so that the size of the display allowable region is changed.

Also, for example, when the display control apparatus 100 has failed to find a layout pattern, the display control apparatus 100 may, for example, send a message indicating a request for production of a layout pattern to the server apparatus 30 using the communication unit 110. The message may be generated by, for example, the template selection unit 134.

In the foregoing, a process has been described which is performed when the result of the determination in step S102 indicates that no item has already been displayed by the display apparatus 10 (step S102, No). Meanwhile, if the result of the determination in step S102 indicates that an item has already been displayed by the display apparatus 10 (step S102, Yes), the display control apparatus 100 cannot ignore the presence of the existing item, and causes a transition to a new display state based on a correspondence relationship with the already displayed item. Here, the number of already displayed items is not limited to one. It may be assumed that a plurality of items have already been displayed on the display apparatus 10. In the description that follows, it is assumed that both the case where the number of items already displayed on the display apparatus 10 is only one and the case where there are two or more items already displayed are included. When an item has already been displayed by the display apparatus 10, the display control apparatus 100 initially acquires the current layout pattern which is being used in display of the item on the display apparatus 10 (step S107). The current layout pattern may be acquired by, for example, the template selection unit 134.

When the current layout pattern has been acquired in step S107, then the display control apparatus 100 determines whether or not the item already displayed on the display apparatus 10 and an item to be newly added are applicable to the current layout pattern (step S108). The determination in step S108 may be performed by, for example, the display form determination unit 136.

If the result of the determination in step S108 indicates that the item already displayed on the display apparatus 10 and an item to be newly added are applicable to the current layout pattern, then the display control apparatus 100 changes the layout of the item already displayed on the display apparatus 10 (old item) (step S109). The process of step S109 of changing the layout of an old item may be performed by, for example, the display form determination unit 136.

Examples of the determination of whether or not a layout pattern is applicable and the process of changing the layout of an old item will be described. It is assumed that items to be displayed on the display apparatus 10 belong to respective groups such as, for example, "weather," "clock," "news," and the like. When there are groups to which items belong, the display control apparatus 100 may determine whether or not a layout pattern is applicable, and change the layout of an old item, taking into consideration the group of an item to be added.

Figure 8:
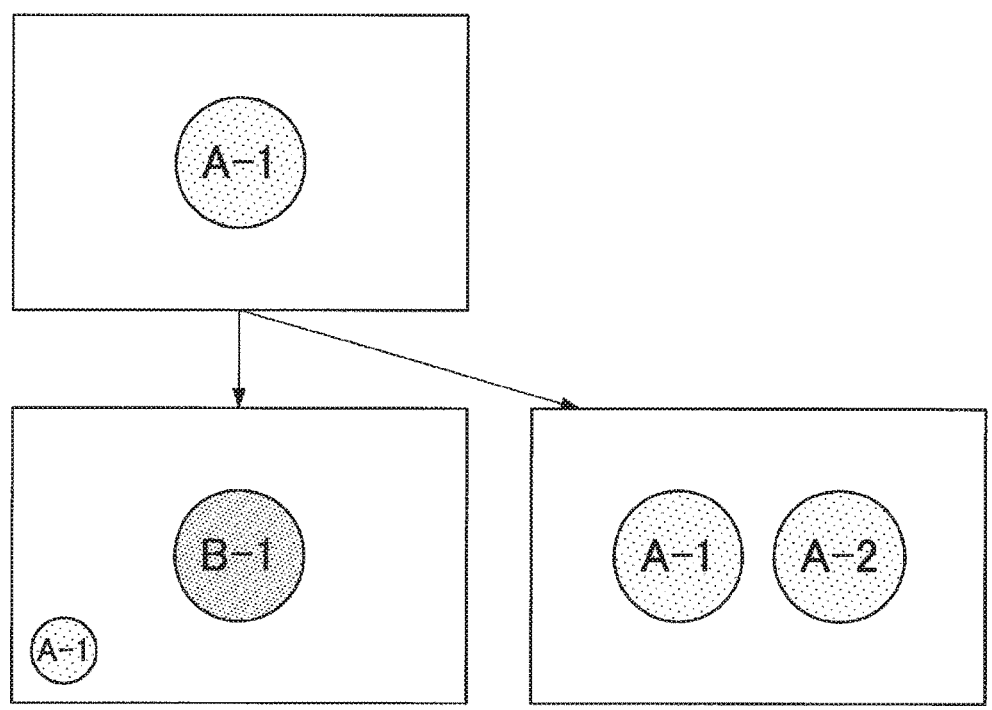
FIG. 8 is a diagram for describing an example of the process of changing the layout of an old item.

FIG. 8 is a diagram for describing an example of the process of changing the layout of an old item. FIG. 8 shows a situation where an item A-1 belonging to the A-group has already been displayed on the display apparatus 10. It is assumed that the A-group is, for example, a "weather" group, and the item A-1 is, for example, the weather forecast for Tokyo. In this situation, for example, there may be different transition branches for different cases, i.e., a case where an item A-2 belonging to the same A-group is to be newly added, and a case where an item B-1 belonging to a different group, i.e., the B-group, is to be newly added, as shown in FIG. 8. It is assumed that the item A-2 is, for example, the weather forecast for New York, and the B-group is, for example, a "clock" group, and the item B-1 is, for example, the time in Tokyo.

For example, when an item belonging to the B-group is newly added, the display control apparatus 100 continues to use a layout pattern having a single main display region, and controls display so that the item A-1 so far displayed is displayed in a sub-display region. When an item belonging to the A-group is newly added, so that the main display region becomes insufficient, the layout pattern may be switched to a different layout pattern having two main display regions. The switching of layout patterns may be performed by the template selection unit 134. The display control apparatus 100 can thus switch applicable layout patterns by utilizing an attribute of items such as a group as defined above.

Figure 9:
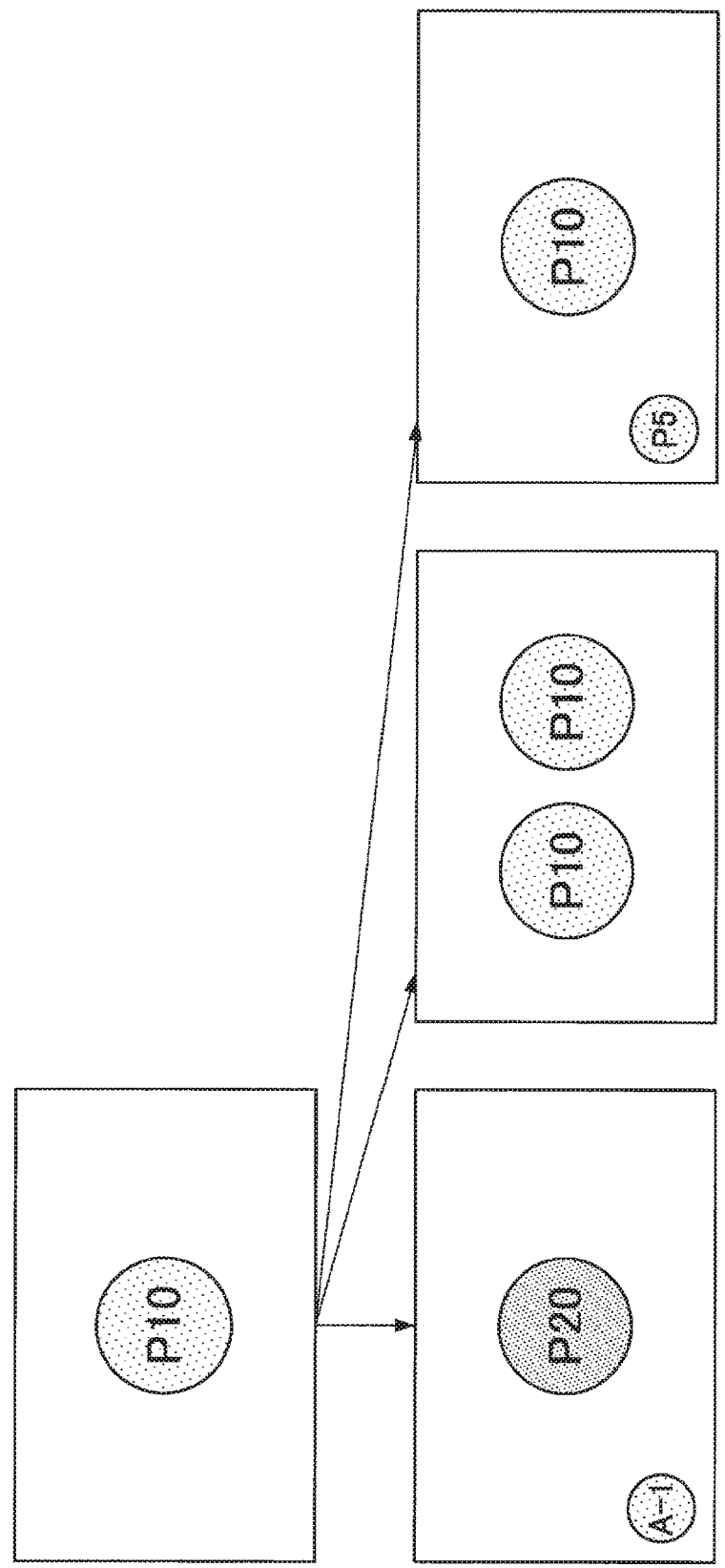
FIG. 9 is a diagram for describing an example of the process of changing the layout of an old item.

When each item displayed on the display apparatus 10 has priority information, the display control apparatus 100 may, for example, compare the priority of an item already displayed on the display apparatus 10 with the priority of an item to be newly displayed. FIG. 9 is a diagram for describing an example of the process of changing the layout of an old item. FIG. 9 shows a situation where an item having a priority of P10 has already been displayed on the display apparatus 10. FIG. 9 shows an example case where while the item having a priority of P10 has already been displayed on the display apparatus 10, items having a priority of P20, P10, and P5 are to be added.

When an item having a higher priority than that of an already displayed item is to be added, the display control apparatus 100 determines to display the new item in a main display region using, for example, the display form determination unit 136, as shown in FIG. 9. Alternatively, when an item having a lower priority than that of an already displayed item is to be newly added, the display control apparatus 100 determines to display the new item in a sub-display region. If an item having the same priority is to be added, the display control apparatus 100 may switch the layout pattern to one having two main display regions. The switching of layout patterns may be performed by, for example, the template selection unit 134. Alternatively, for example, when the sum of the priorities of items exceeds a predetermined threshold, the display control apparatus 100 may change the layout pattern.

It may be considered that a plurality of items are added simultaneously or in a short period of time. When a plurality of items are added simultaneously or in a short period of time, the items are additionally displayed in a stacked manner. For example, when an item is additionally displayed, the display control apparatus 100 may control display of the item to be additionally displayed so that the display forms animation, using, for example, the display form determination unit 136. When display of an item to be additionally displayed is controlled so that the display forms animation, the display control apparatus 100 may perform control so that, after the amination of a firstly displayed item has been completed, the next item is displayed, using, for example, the display form determination unit 136. The display control apparatus 100 may stack items in the same order in which item additional display requests have been generated, or in an order determined on the basis of an index such as priority or the like in item additional display requests which have arrived within a certain period of time.

Note that the display control apparatus 100, when detecting an additional display request for a certain item, may not display the new item for a predetermined period of time, such as, for example, 10 sec. When the display control apparatus 100 detects additional display requests for items during the predetermined period of time, the display control apparatus 100 may successively display the items on the display apparatus 10 after the predetermined period of time has passed. The display control apparatus 100 may display the items on the display apparatus 10 in order of time or priority. Alternatively, the display control apparatus 100 may discard an item having a priority lower than or equal to a predetermined threshold even after the predetermined period of time has passed, instead of displaying it, or alternatively, may display such an item on the display apparatus 10 at predetermined time (e.g., after one minute, etc.), and may notify that an item additional display request has been detected, by mail or the like. Alternatively, the display control apparatus 100 may display an item having a very high priority on the display apparatus 10 in an interrupted manner even before the predetermined period of time has passed.

Each layout pattern may have various acceptable limit values. For example, each layout pattern may have the acceptable number of slots for displaying items, the acceptable total value of priorities, or acceptable display regions.

Figure 10:
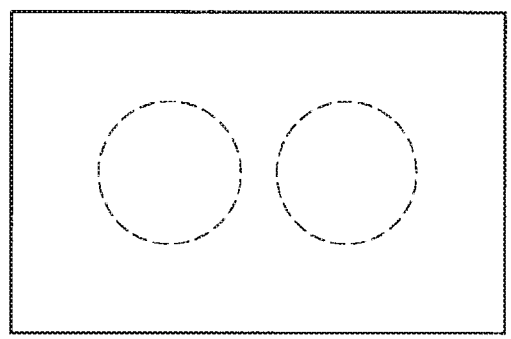
FIG. 10 is a diagram for describing a layout pattern example.

FIG. 10 is a diagram for describing a layout pattern example. FIG. 10 shows a layout pattern example having two empty slots. When the current layout pattern has two empty slots, the display control apparatus 100 can display up to two additional items on the display apparatus 10. For a layout pattern, the maximum number of items to be displayed is defined. When the maximum number of items is exceeded, the display control apparatus 100 does not display some appropriate ones of the items. Note that when the maximum number of items is exceeded, then if a different layout pattern is available, the display control apparatus 100 switches the layout pattern to the different layout pattern to display items on the display apparatus 10.

Figure 11:
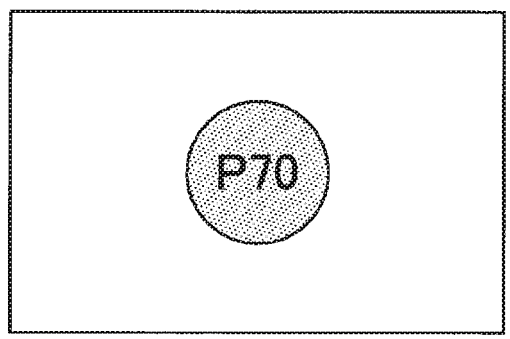
FIG. 11 is a diagram for describing a layout pattern example.

FIG. 11 is a diagram for describing a layout pattern example. FIG. 11 shows a situation where an item having a priority of P70 has already been displayed on the display apparatus 10. When the layout pattern can allow for display of an item(s) having a priority of up to P100, then if an item having a priority of P70 has already been displayed on the display apparatus 10, an item having a priority of up to P30 can be displayed. Specifically, the display control apparatus 100 performs control to display items so that the total of the priorities of items displayed does not exceed a maximum priority applied to a layout pattern. By setting information about an acceptable priority with respect to a layout pattern, the display control apparatus 100 may preferentially display information having a higher priority, or reduce useless display so that a user can more easily notice an item.

Figure 12:
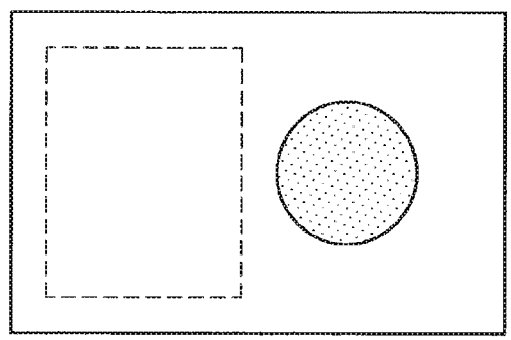
FIG. 12 is a diagram for describing a layout pattern example.

FIG. 12 is a diagram for describing a layout pattern example. FIG. 12 shows a situation where there is a display allowable region having 300 pixels in length×400 pixels in width. The display control apparatus 100 controls display of an item so that the item is displayed in a region smaller than the display allowable region. When an item is to be added, then if a display region larger than the display allowable region is required, the display control apparatus 100 may perform control such as, for example, changing the size of an item to be displayed, applying another layout pattern, rejecting display of a new item, or the like.

The display control apparatus 100 may determine the number of items which can be simultaneously displayed, on the basis of an attribute of items to be additionally displayed on the display apparatus 10, and display items on the display apparatus 10 on the basis of the number of items which can be simultaneously displayed. For example, when two items belonging to weather forecast (e.g., the weather forecast for Tokyo and the weather forecast for New York) have already been displayed on the display apparatus 10, and an item belonging to the same weather forecast (e.g., the weather forecast for London) is to be additionally displayed, the display control apparatus 100 may change the layout pattern so that three weather forecasts are displayed together. Also, for example, when two items belonging to weather forecast (e.g., the weather forecast for Tokyo and the weather forecast for New York) have already been displayed, and an item belonging to another group, i.e., clock (e.g., a clock indicating the time in New York) is to be additionally displayed, the display control apparatus 100 may not change the layout pattern, and display one weather forecast and one clock. Also, for example, when two items belonging to weather forecast (e.g., the weather forecast for Tokyo and the weather forecast for New York) have already been displayed, and an item belonging to mail is to be additionally displayed, only mail may be displayed without changing the layout pattern.

Each item displayed on the display apparatus 10 may have a display duration (lifetime) for which the item continues to be displayed. The display control apparatus 100 may change display of each item according to the lifetime of the item. Examples of the lifetime include:

being erased after being displayed for a period of time;
continuing to be displayed with a reduced size after being displayed for a period of time, and in this case, may be moved from a main display region to a sub-display region;
being always displayed; and
being forced to disappear according to an instruction from a user or a system.

Figure 13:
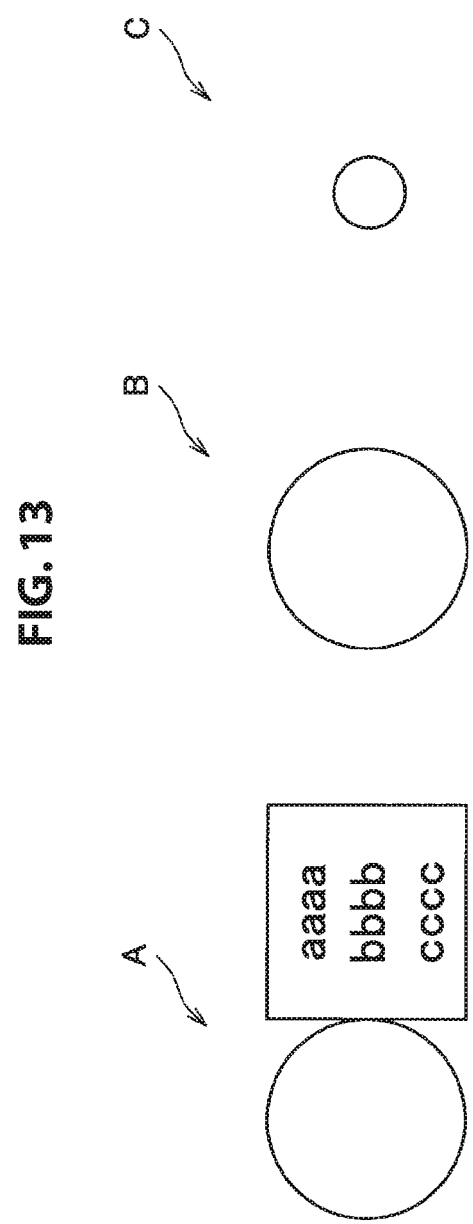
FIG. 13 is a diagram for describing item display form examples.

Each item may be displayed on the display apparatus 10 in a plurality of display forms. FIG. 13 is a diagram for describing item display form examples. FIG. 13 shows three display forms A, B, and C for a certain item. The display form A is, for example, a display form which is defined as having an information amount of 10 and a display amount of 85. The display form B is, for example, a display form which is defined as having an information amount of 5 and a display amount of 48. The display form C is, for example, a display form which is defined as having an information amount of 1 and a display amount of 28. When an item having a plurality of display forms is to be displayed on the display apparatus 10, the display form determination unit 136 determines the arrangement and display form of the item, taking into consideration the selected layout pattern and the display form of the item. When each item to be displayed on the display apparatus 10 thus has a plurality of display states, it is more likely that the display control apparatus 100 can additionally display a new item using the current layout pattern as it is, instead of changing the current layout pattern.

Figure 14:
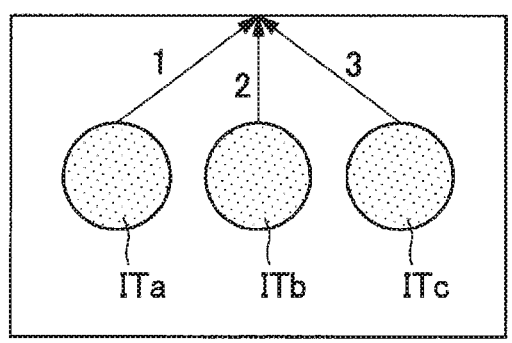
FIG. 14 is a diagram for describing a control example of animation display by a display control apparatus 100.
Figure 15:
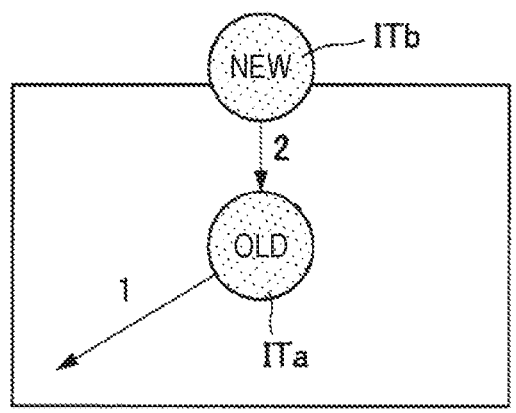
FIG. 15 is a diagram for describing a control example of animation display by a display control apparatus 100.
Figure 16:
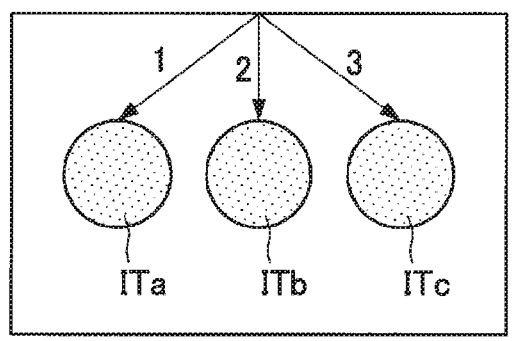
FIG. 16 is a diagram for describing a control example of animation display by a display control apparatus 100.

When an item is additionally displayed on the display apparatus 10 using animation, then if displays overlap due to animation, the display control apparatus 100 may perform animation sequentially so that displays do not overlap. FIGS. 14 to 16 are diagrams for describing a control example of animation display by the display control apparatus 100. FIG. 14 shows an animation display control example in which while three items ITa, ITb, and ITc are being displayed by the display apparatus 10, the items ITa, ITb, and ITc successively move upward in the screen one by one in this order, to disappear from the screen. FIG. 15 shows an animation display control example in which while only the item ITa is being displayed by the display apparatus 10, the item ITb is newly additionally displayed.

FIG. 16 shows an animation display control example in which while no item is being displayed by the display apparatus 10, three items are to be displayed. For example, FIG. 16 shows an animation display control example in which the display control apparatus 100 displays items ITa, ITb, and ITc in order of weather forecast, news, and baseball results when a user says "Let me know weather, news, and baseball results." Therefore, in the example shown in FIG. 16, the item ITa indicates weather forecast, the item ITb indicates news, and ITc indicates the results of baseball games.

Figure 17:
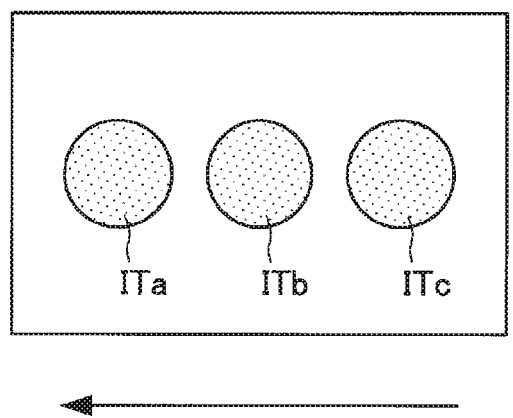
FIG. 17 is a diagram for describing a control example of item addition display by a display control apparatus 100.
Figure 18:
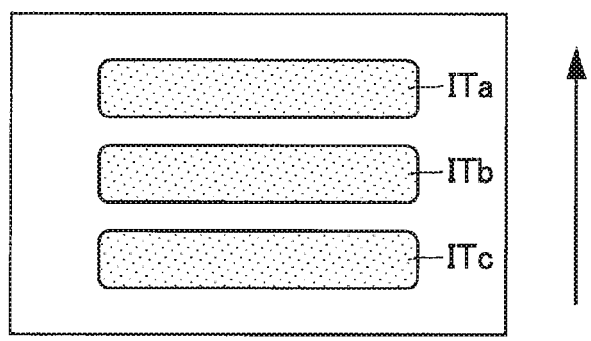
FIG. 18 is a diagram for describing a control example of item addition display by a display control apparatus 100.

There may be various display patterns depending on the order in which items are added. FIGS. 17 and 18 are diagrams for describing a control example in which the display control apparatus 100 additionally displays items. For example, when the current layout pattern is a layout pattern in which items ITa, ITb, and ITc are additionally displayed successively from the right to the left as shown in FIG. 17, or a layout pattern in which items ITa, ITb, and ITc are additionally displayed successively from the bottom to the top as shown in FIG. 18, the display control apparatus 100 may perform control to display the items on the display apparatus 10 in the order in which the items are added. Note that the display control apparatus 100 may sort and display items on the display apparatus 10 according to information such as the production date, updated date, priority, or the like of the items, instead of the times when the items are added.

There may be various display patterns depending on the content type of an item to be displayed. For example, when an item whose content type is <text> and an item whose content type is <image> are to be displayed on the display apparatus 10, then if one of the items has been added, it is not always certain at that time that the other item will be displayed. In other words, when a first item has been added, the display control apparatus 100 selects an optimum layout pattern at that time. However, even if the two items are finally displayed in the same display form, different display forms may be used before the final display form has been determined. Of course, when items to be added are previously known, the display control apparatus 100 may select a final layout pattern in advance, and successively add and display the items according to the layout pattern.

Figure 19:
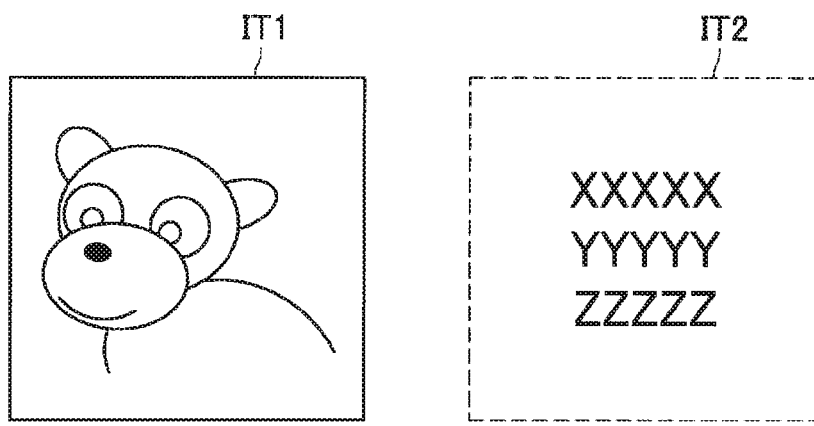
FIG. 19 is a diagram for describing item examples displayed on a display apparatus 10 by a display control apparatus 100.
Figure 20:
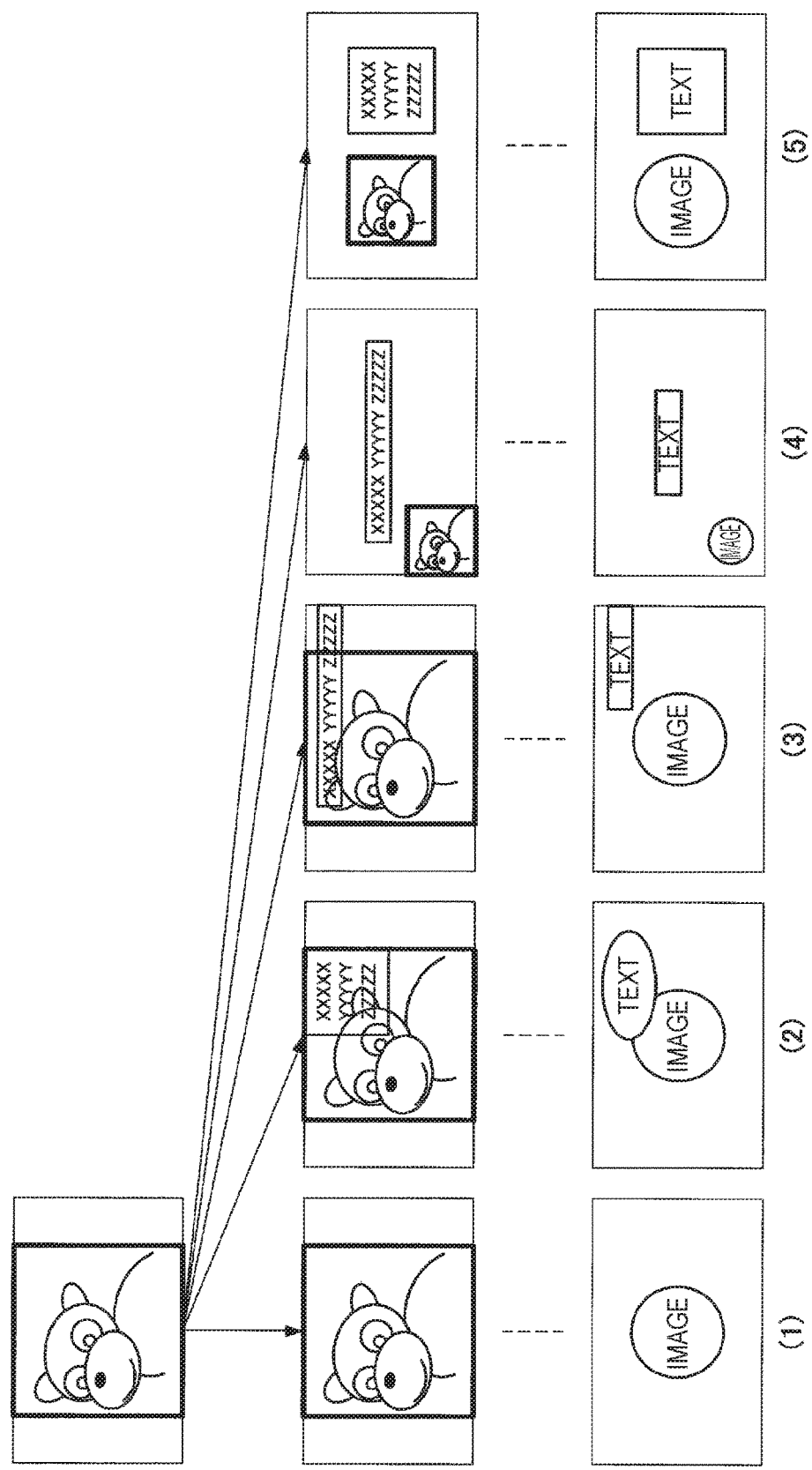
FIG. 20 is a diagram for describing patterns in which two items shown in FIG. 19 are displayed on a display apparatus 10 by a display control apparatus 100.

FIG. 19 is a diagram for describing item examples displayed on the display apparatus 10 by the display control apparatus 100. FIG. 20 is a diagram for describing patterns in which the two items shown in FIG. 19 are displayed on the display apparatus 10 by the display control apparatus 100.

FIG. 19 shows two items, i.e., an image item IT1 and a text item IT2. FIG. 20 shows five patterns in which only the image item is firstly displayed on the display apparatus 10, and then the text item is additionally displayed on the display apparatus 10. The five display patterns in which the text item is added by the display control apparatus 100 will now be described successively from the leftmost one of FIG. 20.

(1) Rejection of Text Display

This pattern is one in which a text item which has a lower priority than that of the already displayed item, belongs to a different item group, or the like, is not displayed by the display apparatus 10.

(2) Text Display

This pattern is one in which a text item which belongs to the same item group, is highly related to the already displayed item, and has a priority similar to that of the already displayed item, is displayed and superimposed on the image item by the display apparatus 10.

(3) Text Display

This pattern is one in which a text item which belongs to a different item group, is poorly related to the already displayed item, and has a similar priority, is displayed by the display apparatus 10 without being superimposed on the image item.

(4) Text Display

This pattern is one in which a text item which belongs to a different item group, is poorly related to the already displayed item, and has a higher priority than that of the already displayed item, is displayed in a main display region while an image item is displayed in a sub-display region, by the display apparatus 10.

(5) Text Display

This pattern is one in which if a text item has a priority similar to that of the already displayed item, the text item and the image item are displayed side by side in a main display region by the display apparatus 10. In this case, the text item to be newly additionally displayed may be displayed to the left of the already displayed image item.

Of course, a display pattern controlled by the display control apparatus 100 is not limited to the above five patterns.

When two or more items are to be added, then if the number of items displayed is predetermined in a layout pattern, the addition of the items may cause the number of displayed items in the layout pattern to exceed the upper limit. In this case, the display control apparatus 100 may erase some appropriate item(s) to empty a display slot. As a rule for erasing an item, for example, an item having the lowest priority, an item which has been displayed for the longest period of time, or the like, may be erased.

When two or more items are to be added, then if there are different layout patterns having different numbers of display slots, the display control apparatus 100 may switch to a layout pattern having a more optimum number of display slots for addition of the items. When a layout pattern having the largest number of display slots, which is possessed by the display control apparatus 100, is not sufficient to display all the items, the display control apparatus 100 may erase some appropriate item(s) as described above. The display control apparatus 100 may check the priority of an item, and if the priority is low, may discard the new item instead of displaying it, as described above.

The display control apparatus 100, when newly additionally displaying an item, may block updating of a layout, and maintain the display. For example, the display control apparatus 100 may detect a user's state, and block updating of a layout. At this time, the entire layout may be blocked, or only a portion thereof may be blocked. For example, the display control apparatus 100 may block updating of only a main display region. While blocking updating of only a main display region, the display control apparatus 100 can display an item in a sub-display region. Meanwhile, the display control apparatus 100 may block updating of only a sub-display region.

For example, when it has been detected that a user aims their face or line of sight at an object displayed on the screen, and the user has gazed at the same point for a predetermined period of time or more, or the user's light of sight has tracked a portion where text is displayed, the display control apparatus 100 may block updating of a layout. Also, for example, when a user's deliberate operation, such as a user's predetermined gesture, uttered voice, or operation of a mouse, keyboard, or touchscreen, has been detected, the display control apparatus 100 may block updating of a layout.

When an item having a high priority has already been displayed, and the priority is higher than or equal to a predetermined value, the display control apparatus 100 may block updating of a layout, and place the item having a high priority in a location which allows a user to easily notice the item.

The display control apparatus 100 may stop blocking updating of a layout after a user's line of sight or body has no longer aimed at the screen, or a predetermined period of time has passed, for example. Alternatively, the display control apparatus 100 may stop blocking updating of a layout when an item having a high priority has no longer been displayed. Alternatively, the display control apparatus 100 may stop blocking updating of a layout when a user deliberately desires a new item. After stopping blocking updating of a layout, the display control apparatus 100 may display, on the display apparatus 10, items which have been stacked during the blocking.

The priority set for an item may be changed with time. The display control apparatus 100 may continuously decrease (or increase) the priority of an item with time, or alternatively, may maintain the priority for a certain period of time, and after that time period has passed, decrease (or increase) the priority. For example, when a timer for notifying a user of the time when the user should leave home for work is to be displayed as an item, the display control apparatus 100 increases the priority of the item as time elapses. The display control apparatus 100 may dynamically change a layout pattern suitable for a priority set for an item, according to a change in the priority.

The display control apparatus 100 may maintain the priority of an item until a user has already viewed the item using a certain method, such as, for example, aiming the line of sight at the item, uttering a voice, operating a mouse, keyboard, or touchscreen, or the like, and then when the item has already viewed, may decrease (or increase) the priority. For example, when a notification of mail reception is displayed as an item on the display apparatus 10, then if a user has viewed the notification of mail reception, the display control apparatus 100 may decrease the priority of the item.

In order to determine whether or not an item, such as, for example, a text item, has already been viewed, the display control apparatus 100 may detect a user's line of sight, and track the user's line of sight until the user has read text, or alternatively, calculate a period of time which it takes until the item has already been viewed, on the basis of the amount of the text.

Conversely, when an item has already been viewed, the display control apparatus 100 may maintain or increase the priority of the item. When a long sentence, such as, for example, news, is displayed as an item or there are simultaneously a plurality of viewers, then if the item has already been viewed, the priority of the item may be maintained or increased. When an item has already been viewed, the priority may be appropriately determined on the basis of the content type (image/text, etc.), or the type of a service provided by the server apparatus 30 (news, SNS, weather, clock, etc.).

The display control apparatus 100 may change the priority of an item according to an external factor. For example, when information about a delay of a train has been issued as an item, then the train service is restored, so that the information becomes old, the display control apparatus 100 may decrease the priority of the item. Also, for example, when a notification which recommends a TV program which starts at 19 o'clock has been displayed, then if it is past that time and the program is finished, the display control apparatus 100 may decrease the priority of the item. Also, for example, when information for notifying of warning of heavy rain has been displayed as an item, then if the warning is reduced to an advisory, the display control apparatus 100 may decrease the priority of the item.

Variations of a change in a layout pattern due to addition of an item are shown. The display control apparatus 100 may compare the item group of an item which has already been displayed with the item group of an item which is to be additionally displayed, and change a location where a display is to be generated, on the basis of the result of the comparison. For example, if an item belonging to the same item group is to be added, the display control apparatus 100 may first display an item belonging to the same item group as that of an already displayed item in order to indicate the relationship between the items. If an item belonging to a different item group is to be added, the display control apparatus 100 may display the item from the outside. Therefore, even when the display control apparatus 100 finally displays the same layout pattern, the display may transition differently.

Figure 21:
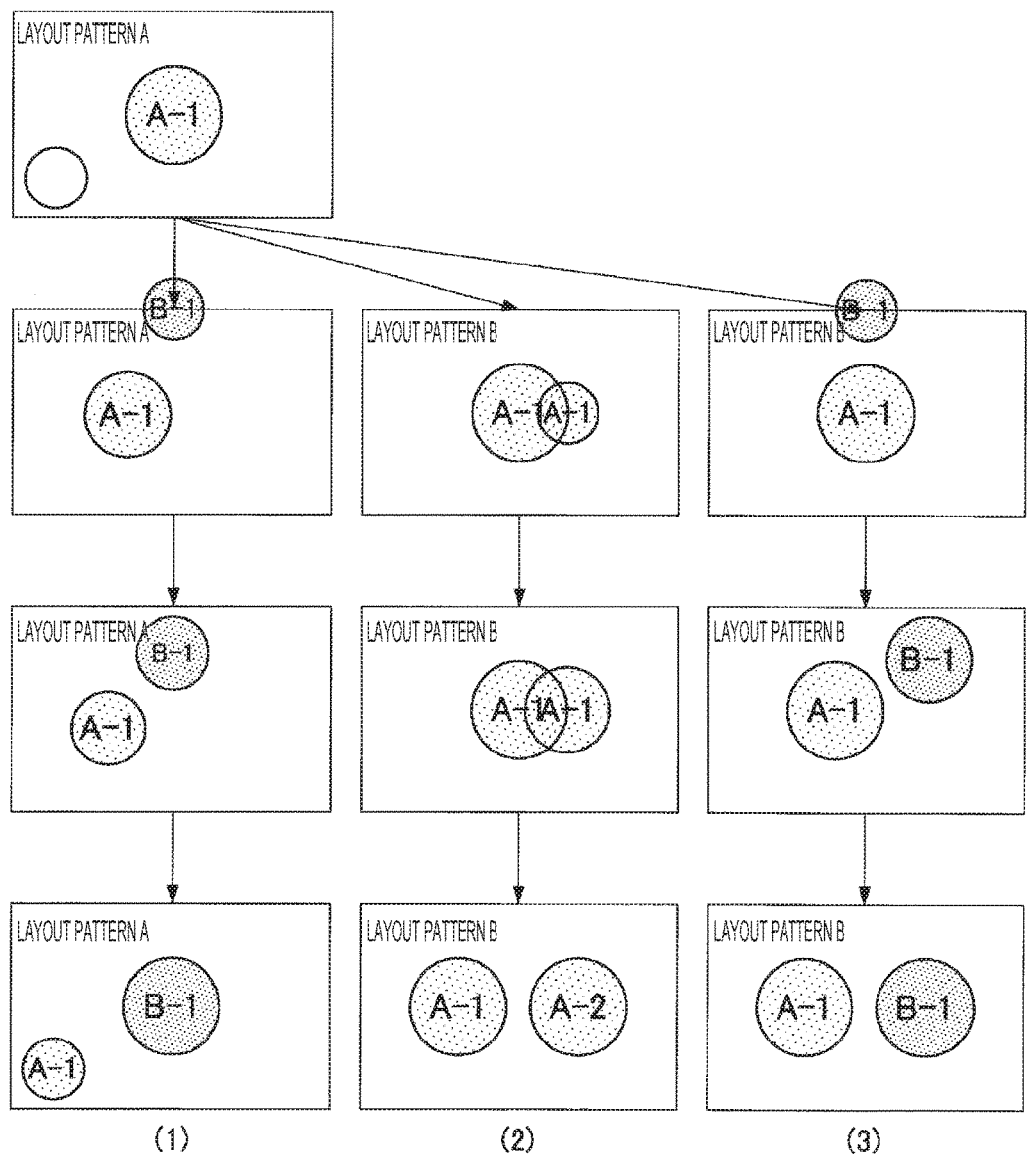
FIG. 21 is a diagram showing variations of a change in a layout pattern due to additional display of an item.

FIG. 21 is a diagram showing variations of a change in a layout pattern due to additional display of an item. FIG. 21 shows three variations of a change in a layout pattern due to additional display of an item, where a layout pattern-A in which only one item can be displayed in a main display region is used, and an item A-1 has already been displayed in the main display region by the display apparatus 10. The three variations of a change in a layout pattern displayed by the display control apparatus 100 will now be described from the leftmost one of FIG. 21.

(1) When an item belonging to an item group different from that of an already displayed item is to be additionally display, the layout pattern is maintained. When the item A-1 has already been displayed, then if an item B-1 belonging to an item group different from that of the item A-1 is to be displayed, the display control apparatus 100 maintains the layout pattern-A in which only one item can be displayed in the main display region, moves the item A-1 to a sub-display region, and displays the item B-1 in the main display region.

(2) When an item belonging to the same item group as that of an item already displayed is to be additionally displayed, the layout pattern is changed. When the item A-1 has already been displayed, then if an item A-2 belonging to the same item group as that of the item A-1 is to be displayed, the display control apparatus 100 changes the layout pattern to a layout pattern B in which two items can be displayed in the main display region, and displays the items A-1 and A-2 in the main display region.

(3) When an item belonging to an item group different from that of an already displayed item is to be additionally display, the layout pattern is changed. When the item A-1 has already been displayed, then if an item B-1 belonging to an item group different from that of the item A-1 is to be displayed, the display control apparatus 100 changes the layout pattern to a layout pattern B in which two items can be displayed in the display region, and displays the items A-1 and B-1 in the main display region.

Of course, a change in a layout pattern under the control of the display control apparatus 100 is not limited to the three patterns.

The display control apparatus 100 may change a layout pattern according to the number of users who are viewing a screen displayed by the display apparatus 10. When two or more users are viewing the screen displayed by the display apparatus 10, the display control apparatus 100 may provide different numbers of items (the number of slots) which can be displayed in a main display region or a sub-display region to different users. Alternatively, when two or more users are viewing the screen displayed by the display apparatus 10, the display control apparatus 100 may perform display control so that the screen is divided and displayed. Alternatively, when two or more users are viewing the screen displayed by the display apparatus 10, the display control apparatus 100 may perform display control according to a user who utters a voice. Note that a user who utters a voice can be identified on the basis of the direction of the sound source, the tone of the voice, or the like. Note that either a situation where a plurality of users are actually located in front of the same screen or a situation where a plurality of users are located at a remote place connected through a network, may be included.

2. Hardware Configuration

Figure 22:
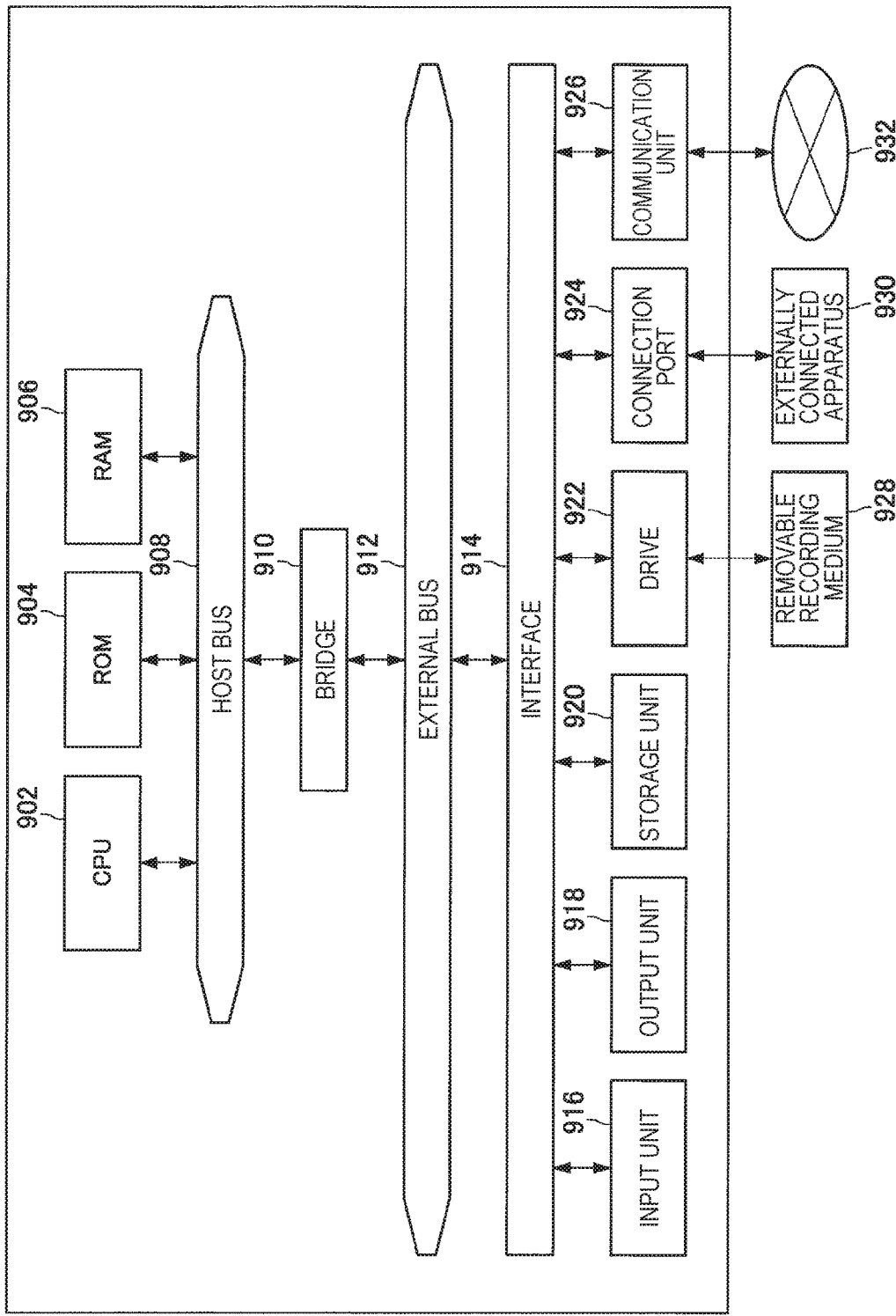
FIG. 22 is a diagram for describing a hardware configuration example.

Next, a hardware configuration of the display control apparatus 100 according to an embodiment of the present disclosure will be described with reference to FIG. 22. FIG. 22 is a block diagram illustrating a hardware configuration example of the display control apparatus 100 according to the embodiment of the present disclosure. Each of the algorithms described above can be performed by using, for example, the hardware configuration of the information processing apparatus shown in FIG. 22. That is, the processing of each of the algorithms can be realized by controlling the hardware shown in FIG. 22 using a computer program. Note that the mode of this hardware is arbitrary, and may be, for example, a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 22, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, and controls entire operation or a part of the operation of each structural element based on various programs recorded on the ROM 904, the RAM 906, the storage unit 920, or a removable recording medium 928. The ROM 904 is a device for storing a program to be read by the CPU 902 or data or the like used in an arithmetic operation. The RAM 906 temporarily or perpetually stores, for example, a program to be read by the CPU 902 or various parameters or the like appropriately changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touchscreen, a button, a switch, or a lever. Also, the input unit 916 may be a remote controller that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. The CRT is an abbreviation for Cathode Ray Tube. In addition, the LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928, for example, a magnetic disk, an optical disc, a magneto-optical disc, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured from a wire-connected or wirelessly connected network, and is the Internet, a home-use LAN, infrared communication, visible light communication, broadcasting, or satellite communication, for example. The LAN is an abbreviation for Local Area Network. Also, the WUSB is an abbreviation for Wireless USB. Furthermore, the ADSL is an abbreviation for Asymmetric Digital Subscriber Line.

The foregoing thus illustrates an exemplary hardware configuration of the display control apparatus 100. Each of the above components may be realized using general-purpose members, but may also be realized in hardware specialized in the function of each component. Such a configuration may also be modified as appropriate according to the technological level at the time of the implementation.

2. Conclusion

As described above, according to one embodiment of the present disclosure, in a system in which items are successively displayed according to item additional display requests, the display control apparatus 100 which can automatically optimize objects having various forms and display the objects on the display apparatus 10, can be provided. The display control apparatus 100 according to one embodiment of the present disclosure arranges items in a layout pattern, and therefore, can automatically optimize objects having various forms and display the objects on the display apparatus 10.

The display control apparatus 100 according to one embodiment of the present disclosure, when arranging items in a layout pattern, determines a layout pattern to be used, on the basis of information about an already displayed item, and information about an item to be additionally displayed. The information about an item may include the content type of the item, the priority of the item, and the like. The display control apparatus 100 according to one embodiment of the present disclosure determines a layout pattern to be used, on the basis of information about an item, and therefore, can automatically optimize objects having various forms and display the objects on the display apparatus 10.

It may not be necessary to chronologically execute respective step S in the processing, which is executed by each device of this specification, in the order described in the sequence diagrams or the flow charts. For example, the respective step S in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices so that a series of processes may be implemented by the hardware devices.

Also, the display control apparatus 100 according to one embodiment of the present disclosure may be implemented as an apparatus (e.g., a server apparatus connected to an apparatus including a display, through a network, such as the Internet or the like) separated from an apparatus including a display for displaying an image which is to be displayed as a result of a process performed by the display control apparatus 100, or may be implemented in a terminal apparatus which receives information from a server apparatus. Also, the display control apparatus 100 according to one embodiment of the present disclosure may be implemented as a single apparatus or as a system in which a plurality of apparatuses cooperate with each other. Examples of the system in which a plurality of apparatuses cooperate with each other include a combination of a plurality of server apparatuses, a combination of a server apparatus and a terminal apparatus, and the like.

Note that software that realizes a user interface or an application shown in the above-described embodiments may be realized as a web application that is used via a network such as the Internet. Such a web application may be realized with a markup language, for example, HyperText Markup Language (HTML), Standard Generalized Markup Language (SGML), Extensible Markup Language (XML), or the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A display control apparatus including:

a display form determination unit configured to determine a display form of an additional display item which is to be additionally displayed on a screen according to a display item addition request, on the basis of first information about the additional display item, and second information about an already displayed item which has already been displayed on the screen before the additional display item is displayed; and an issuance unit configured to issue display control information for controlling display of the screen on the basis of the display form of the additional display item determined by the display form determination unit.

(2)

The display control apparatus according to (1), wherein there are a plurality of the already displayed items, and the display form determination unit determines the display form of the additional display item on the basis of information related to the plurality of already displayed items and information related to the additional display item.

(3)

The display control apparatus according to (2), wherein the display form determination unit determines the display form of the additional display item on the basis of a layout of the plurality of already displayed items.

(4)

The display control apparatus according to any of (1) to (3), wherein the display form determination unit determines a size of the additional display item as the display form of the additional display item.

(5)

The display control apparatus according to any of (1) to (4), wherein the display form determination unit determines an amount of information about the additional display item as the display form of the additional display item.

(6)

The display control apparatus according to any of (1) to (5), wherein the display form determination unit determines an arrangement of the additional display item and the display form of the additional display item on the basis of a physical state of a user.

(7)

The display control apparatus according to (6), wherein the display form determination unit determines the arrangement of the additional display item and the display form of the additional display item on the basis of a location of the user as the physical state of the user.

(8)

The display control apparatus according to any of (1) to (7), wherein the display form determination unit determines a display size of the display item on the basis of a priority of the additional display item.

(9)

The display control apparatus according to (8), wherein the display form determination unit determines an arrangement of the additional display item, also on the basis of a priority of the already displayed item.

(10)

The display control apparatus according to any of (1) to (9), wherein if a display region is designated for the additional display item, the display form determination unit determines an arrangement of the display item on the basis of the designation.

The display control apparatus according to any of (1) to (10), wherein the display form determination unit determines an arrangement of the display item on the basis of an attribute of the already displayed item.

(12)

The display control apparatus according to any of (1) to (11), wherein the display form determination unit controls display of each of display items according to a display duration set for each of the display items.

(13)

The display control apparatus according to any of (1) to (12), further including:

a template selection unit configured to, if the display item addition request is generated, select a template for a layout of the display item according to the first information and the second information.

(14)

The display control apparatus according to (13), wherein the template includes a main display region and one or more sub-display regions.

(15)

The display control apparatus according to (13) or (14), wherein if a suitable template selectable by the template selection unit does not exist, the template selection unit acquires a new template.

(16)

The display control apparatus according to any of (13) to (15), wherein the template selection unit determines whether or not to change the template according to the display item addition request.

(17)

The display control apparatus according to any of (13) to (16), wherein if the number of display items exceeds a predetermined threshold due to the display item addition request, the template selection unit changes the template.

(18)

The display control apparatus according to any of (13) to (17), wherein if the sum of priorities of the display items exceeds a predetermined threshold, the template selection unit changes the template.

(19)

A display control method including:

determining a display form of an additional display item which is to be additionally displayed on a screen according to a display item addition request, on the basis of first information about the additional display item, and second information about an already displayed item which has already been displayed on the screen before the additional display item is displayed; and issuing display control information for controlling display of the screen on the basis of the determined display form of the additional display item.

(20)

A computer program for causing a computer to execute:

determining a display form of an additional display item which is to be additionally displayed on a screen according to a display item addition request, on the basis of first information about the additional display item, and second information about an already displayed item which has already been displayed on the screen before the additional display item is displayed; and issuing display control information for controlling display of the screen on the basis of the determined display form of the additional display item.

REFERENCE SIGNS LIST 1 display system
10 display apparatus
20 input apparatus
30 server apparatus
100 display control apparatus
110 communication unit
120 input unit
130 control unit
132 detection unit
134 template selection unit
136 display form determination unit
140 storage unit
150 output unit

The invention claimed is:

1. A display control apparatus, comprising:
a display form determination unit configured to:
determine a display form of an additional display item based on first information related to the additional display item, and second information related to an already displayed item,
wherein the already displayed item is displayed on a screen of a display apparatus before a display of the additional display item, and
wherein the additional display item is displayed on the screen based on a display item addition request;
determine a display size of the additional display item based on a priority of the additional displayed item;
determine an arrangement of the additional display item and the display form of the additional display item, based on the determined display size of the additional display item; and
an issuance unit configured to issue display control information to control display of the screen based on the determined display form of the additional display item.

2. The display control apparatus according to claim 1,
wherein the display form determination unit is further configured to:
determine third information of a plurality of already displayed items, wherein the plurality of already displayed items includes the already displayed item, and
determine the display form of the additional display item based on the third information related to the plurality of already displayed items and the first information related to the additional display item.

3. The display control apparatus according to claim 2, wherein the display form determination unit is further configured to determine the display form of the additional display item based on a layout of the plurality of already displayed items.

4. The display control apparatus according to claim 1, wherein the display form determination unit is further configured to determine the arrangement of the additional display item and the display form of the additional display item based on a physical state of a user.

5. The display control apparatus according to claim 1, wherein the display form determination unit is further configured to determine the arrangement of the additional display item based on a priority of the already displayed item.

6. The display control apparatus according to claim 1, wherein the display form determination unit is further configured to determine the arrangement of the additional display item based on the additional display item corresponding to a display region.

7. The display control apparatus according to claim 1, wherein the display form determination unit is further configured to determine an arrangement of the already displayed item based on an attribute of the already displayed item.

8. The display control apparatus according to claim 1, wherein the display form determination unit is further configured to control display of each of display items according to a display duration set for each of the display items.

9. The display control apparatus according to claim 1, further comprising:
a template selection unit configured to select, based on the display item addition request is generated, a template for a layout of the additional display item and the already displayed item according to the first information and the second information.

10. The display control apparatus according to claim 9, wherein the template includes a main display region and at least one sub-display region.

11. The display control apparatus according to claim 9, wherein the template selection unit is further configured to acquire a new template based on an absence of a suitable template.

12. The display control apparatus according to claim 9, wherein the template selection unit is further configured to change the template based on the display item addition request.

13. The display control apparatus according to claim 9, wherein the template selection unit is further configured to change the template based on a number of display items that exceeds a threshold value.

14. The display control apparatus according to claim 9, wherein the template selection unit is configured to change the template based on a sum of priorities of display items that exceeds a threshold value.

15. A display control method, comprising:
in a display control apparatus:
determining, by at least one processor in the display control apparatus, a display form of an additional display item based on first information related to the additional display item, and second information related to an already displayed item,
wherein the already displayed item is displayed on a screen of a display apparatus before a display of the additional display item, and
wherein the additional display item is displayed on the screen based on a display item addition request;
determining, by the at least one processor in the display control apparatus, a display size of the additional display item based on a priority of the additional displayed item;
determining, by the at least one processor in the display control apparatus, an arrangement of the additional display item and the display form of the additional display item, based on the determined display size of the additional display item; and
issuing, by the at least one processor in the display control apparatus, display control information for controlling display of the screen based on the determined display form of the additional display item.

16. A non-transitory computer-readable medium having stored thereon, computer-executable instructions which when executed by a computer, cause the computer to operations, the operations comprising:
determining a display form of an additional display item based on first information related to the additional display item, and second information related to an already displayed item,
wherein the already displayed item is displayed on a screen of a display apparatus before a display of the additional display item, and
wherein the additional display item is displayed on the screen based on a display item addition request;
determining a display size of the additional display item based on a priority of the additional displayed item;
determining an arrangement of the additional display item and the display form of the additional display item, based on the determined display size of the additional display item; and
issuing display control information for controlling display of the screen based on the determined display form of the additional display item.

* * * * *